US008970428B2

(12) United States Patent
Yano et al.

(10) Patent No.: US 8,970,428 B2
(45) Date of Patent: Mar. 3, 2015

(54) SLOT ANTENNA AND RADAR DEVICE

(75) Inventors: Koji Yano, Nishinomiya (JP); Yasutaka Yoshijima, Nishinomiya (JP)

(73) Assignee: Furuno Electric Company Limited, Hyogo (JP)

( * ) Notice: Subject to any disclaimer, the term of this patent is extended or adjusted under 35 U.S.C. 154(b) by 694 days.

(21) Appl. No.: 13/082,125

(22) Filed: Apr. 7, 2011

(65) Prior Publication Data

US 2011/0248884 A1 Oct. 13, 2011

(30) Foreign Application Priority Data

Apr. 9, 2010 (JP) ................................ 2010-090964

(51) Int. Cl.

| | |
|---|---|
| ***G01S 13/00*** | (2006.01) |
| ***H01Q 13/10*** | (2006.01) |
| ***H01Q 21/00*** | (2006.01) |
| ***H01Q 1/42*** | (2006.01) |

(52) U.S. Cl.

CPC ......... *H01Q 21/005* (2013.01); *H01Q 21/0043* (2013.01); *H01Q 21/0037* (2013.01); *H01Q 21/0006* (2013.01); *H01Q 1/42* (2013.01)

USPC ............ 342/175; 343/767; 343/770; 343/771

(58) Field of Classification Search

USPC .......... 342/175; 343/746, 767–772, 824–828, 343/843, 844, 700 MS

See application file for complete search history.

(56) References Cited

U.S. PATENT DOCUMENTS

| | | | | | |
|---|---|---|---|---|---|
| 2,527,146 | A | * | 10/1950 | Mumford | 333/33 |
| 3,599,216 | A | * | 8/1971 | Paine et al. | 343/771 |
| 3,691,563 | A | * | 9/1972 | Shelton | 343/771 |
| 4,054,874 | A | * | 10/1977 | Oltman, Jr. | 343/700 MS |
| 4,144,506 | A | * | 3/1979 | McCammon et al. | 333/26 |
| 4,164,742 | A | * | 8/1979 | Nemit | 343/768 |
| 4,429,313 | A | * | 1/1984 | Muhs et al. | 343/771 |
| 5,019,831 | A | * | 5/1991 | Yee et al. | 343/771 |
| 5,189,433 | A | * | 2/1993 | Stern et al. | 343/770 |
| 5,357,260 | A | * | 10/1994 | Roederer et al. | 343/754 |
| 5,369,414 | A | * | 11/1994 | Yee et al. | 343/771 |
| 5,438,697 | A | * | 8/1995 | Fowler et al. | 455/347 |
| 5,473,334 | A | * | 12/1995 | Yee et al. | 343/756 |
| 5,475,394 | A | * | 12/1995 | Kohls et al. | 343/700 MS |
| 5,579,019 | A | * | 11/1996 | Uematsu et al. | 343/771 |
| 5,726,666 | A | * | 3/1998 | Hoover et al. | 343/770 |
| 5,831,583 | A | * | 11/1998 | Lagerstedt et al. | 343/771 |

(Continued)

FOREIGN PATENT DOCUMENTS

WO 2008/018481 A1 2/2008

*Primary Examiner* — Peter Bythrow

(74) *Attorney, Agent, or Firm* — Global IP Counselors, LLP

(57) ABSTRACT

This disclosure provides a slot antenna, which includes a tubular electromagnetic wave radiation part having a hollow space, a plurality of electromagnetic wave radiating slots for radiating electromagnetic waves being formed in at least a part of a side surface of the radiation part and a plurality of feeding slots for being inputted with the electromagnetic waves being arrayed in line in another part of the side surface opposing to the radiating slots, a feeding part having a hollow space, extending along the feeding slot array, and for feeding power from the outside of the radiation part to the feeding slots, and a power guiding part having a hollow space and for guiding the power to the feeding part, the power guiding part extending in a direction orthogonal to the array direction of the feeding slots and in parallel to the center axis of the radiation part, from a location of the feeding part corresponding to at least one of the feeding slots.

20 Claims, 26 Drawing Sheets

(56) References Cited

U.S. PATENT DOCUMENTS

| | | | | | |
|---|---|---|---|---|---|
| 5,977,924 | A * | 11/1999 | Takei et al. | ..... | 343/770 |
| 6,049,311 | A * | 4/2000 | Alexanian | ..... | 343/771 |
| 6,111,474 | A * | 8/2000 | Nibe | ..... | 333/26 |
| 6,166,701 | A * | 12/2000 | Park et al. | ..... | 343/771 |
| 6,181,291 | B1 * | 1/2001 | Anderson et al. | ..... | 343/816 |
| 6,297,782 | B1 * | 10/2001 | Matthews et al. | ..... | 343/771 |
| 6,304,228 | B1 * | 10/2001 | Smith et al. | ..... | 343/771 |
| 6,489,930 | B2 * | 12/2002 | Teshirogi et al. | ..... | 343/785 |
| 6,597,322 | B2 * | 7/2003 | Takenoshita | ..... | 343/771 |
| 6,731,241 | B2 * | 5/2004 | Park et al. | ..... | 342/361 |
| 6,977,621 | B2 * | 12/2005 | Kelly et al. | ..... | 343/771 |
| 7,119,753 | B2 * | 10/2006 | Hidai et al. | ..... | 343/771 |
| 7,202,832 | B2 * | 4/2007 | Wang | ..... | 343/771 |
| 7,315,222 | B2 * | 1/2008 | Freeman | ..... | 333/26 |
| 7,450,071 | B1 * | 11/2008 | Volman | ..... | 343/700 MS |
| 7,498,994 | B2 * | 3/2009 | Vacanti | ..... | 343/725 |
| 8,098,189 | B1 * | 1/2012 | Woodell et al. | ..... | 342/26 R |
| 8,183,954 | B2 * | 5/2012 | Yano | ..... | 333/26 |
| 2002/0101386 | A1 * | 8/2002 | Takenoshita | ..... | 343/772 |
| 2003/0016162 | A1 * | 1/2003 | Sasada et al. | ..... | 342/70 |
| 2004/0135720 | A1 * | 7/2004 | Sasada et al. | ..... | 342/175 |
| 2005/0040993 | A1 * | 2/2005 | Hidai et al. | ..... | 343/771 |
| 2005/0140556 | A1 * | 6/2005 | Ohno et al. | ..... | 343/770 |
| 2005/0146476 | A1 * | 7/2005 | Wang et al. | ..... | 343/771 |
| 2005/0146478 | A1 * | 7/2005 | Wang et al. | ..... | 343/771 |
| 2005/0253767 | A1 * | 11/2005 | Liu et al. | ..... | 343/770 |
| 2006/0132374 | A1 * | 6/2006 | Wang | ..... | 343/770 |
| 2006/0187122 | A1 * | 8/2006 | Noro et al. | ..... | 343/700 MS |
| 2007/0013581 | A1 * | 1/2007 | Iijima et al. | ..... | 342/175 |
| 2007/0109178 | A1 * | 5/2007 | Schultheiss | ..... | 342/124 |
| 2008/0074338 | A1 * | 3/2008 | Vacanti | ..... | 343/771 |
| 2008/0117113 | A1 * | 5/2008 | Haziza | ..... | 343/786 |
| 2008/0117114 | A1 * | 5/2008 | Haziza | ..... | 343/786 |
| 2008/0246553 | A1 * | 10/2008 | Okamoto | ..... | 333/26 |
| 2008/0252521 | A1 * | 10/2008 | Sabet et al. | ..... | 342/368 |
| 2008/0266195 | A1 * | 10/2008 | Yamaguchi et al. | ..... | 343/771 |
| 2009/0058747 | A1 * | 3/2009 | Haziza | ..... | 343/772 |
| 2009/0066597 | A1 * | 3/2009 | Yang et al. | ..... | 343/771 |
| 2009/0121952 | A1 * | 5/2009 | Shibuya et al. | ..... | 343/767 |
| 2009/0295511 | A1 * | 12/2009 | Ligander et al. | ..... | 333/239 |
| 2010/0001916 | A1 * | 1/2010 | Yamaguchi et al. | ..... | 343/771 |
| 2010/0085263 | A1 * | 4/2010 | Yano | ..... | 343/771 |
| 2010/0164827 | A1 * | 7/2010 | Miyagawa et al. | ..... | 343/843 |
| 2010/0321265 | A1 * | 12/2010 | Yamaguchi et al. | ..... | 343/771 |

* cited by examiner

C = 2

C = 4

SLOT ANTENNA AND RADAR DEVICE

CROSS-REFERENCE TO RELATED APPLICATION(S)

The application claims priority under 35 U.S.C §119 to Japanese Patent Application No. 2010-090964, which was filed on Apr. 9, 2010, the entire disclosure of which is hereby incorporated by reference.

TECHNICAL FIELD

The present invention relates to a structure of an antenna having a two-dimensional array of slots, and a radar device that contains this antenna.

BACKGROUND OF THE INVENTION

In comparison to the existing type of antenna including a waveguide, which has a plurality of radiating slots arranged in a longitudinal direction thereof, and a radiating horn attached to the waveguide, a slot array antenna including a radiation waveguide, which has a plurality of radiating slots arranged in lateral and longitudinal directions thereof on a two-dimensional radiation plane, has been presented in recent years for the purpose of ease in manufacturing and size reduction (WO2008/018481). The slot array antenna disclosed in WO2008/018481 includes a radiation waveguide arranged with a two-dimensional slot array and a feeding waveguide arranged with a slot array and for guiding (feeding) an electromagnetic wave to the radiation waveguide from a direction orthogonal to a propagation direction of the radiation waveguide for electromagnetic wave, which are coupled with each other (see WO2008/018481).

The feeding waveguide coupled to the radiation waveguide disclosed in WO2008/018481 has in general, structures shown in FIGS. 25A and 25B. That is, the structure shown in FIG. 25A is what a feeding waveguide 100 is simply coupled to a radiation waveguide 200 in an orthogonal direction (width direction) thereto, and the structure shown in FIG. 25B is what is designed to keep the dimension of a feeding waveguide 101 in the width direction of the radiation waveguide 200 the same as or smaller than the width dimension of the radiation waveguide 200 by bending the feeding waveguide 101 to be an "L" shape.

In the structure shown in FIG. 25A, a section of the feeding waveguide 100 corresponding to feeding slots 100*a* are contained within the width dimension of the radiation waveguide 200; however, a section of the feeding waveguide 100 on a base end 100*b* side protrudes outside the width dimension of the radiation waveguide 200, thus limiting size reduction of the slot array antenna. Further, in the structure shown in FIG. 25B, although the structure of the feeding waveguide 101 is contained within the width dimension of the radiation waveguide 200, feed characteristics of an electromagnetic wave from feeding slots 101*a* of the feeding waveguide 101 to the radiation waveguide 200 become ununiform, particularly in width directions, due to a discontinuous section such as a bent section 101*c* of the feeding waveguide 101. As a result, a transmission mode pattern of the electromagnetic wave which propagates within the radiation waveguide 200 breaks down.

SUMMARY OF THE INVENTION

The present invention is made in view of the above situations, and provides a slot antenna that allows, by improving a structure of a slot antenna, a propagation of electromagnetic wave in a proper transmission mode pattern within a radiation waveguide and a size reduction, and a radar device including the item.

According to an aspect of the invention, a slot antenna is provided, which includes a tubular electromagnetic wave radiation part having a hollow space, a plurality of electromagnetic wave radiating slots for radiating electromagnetic waves being formed in at least a part of a side surface of the radiation part and a plurality of feeding slots for being inputted with the electromagnetic waves being arrayed in line in another part of the side surface opposing to the radiating slots, a feeding part having a hollow space, extending along the feeding slot array, and for feeding power from the outside of the radiation part to the feeding slots, and a power guiding part having a hollow space and for guiding the power to the feeding part, the power guiding part extending in a direction orthogonal to the array direction of the feeding slots and in parallel to the center axis of the radiation part, from a location of the feeding part corresponding to at least one of the feeding slots.

As described above, the electromagnetic wave inputted to the power guiding part extending in the direction orthogonal to the array direction of the feeding slots and in parallel to the center axis of the radiation part, from the location of the feeding part corresponding to at least one of the feeding slots, is guided to the feeding part and further inputted to the feeding slots. Then, the electromagnetic wave is guided to the radiation part through each feeding slot. Thus, by extending the power guiding part in the direction orthogonal to the array direction of the feeding slots and in parallel to the center axis of the radiation part, from the location of the feeding part corresponding to at least one of the feeding slots, a size suppressed and compact slot antenna can be manufactured.

A bulged portion may be formed in at least a portion of an inner wall of the feeding part opposing to the feeding slot so that the portion of the feeding part is bulged more than an inner wall of the power guiding part facing the same side as the inner wall of the feeding part.

The at least one of the feeding slots may be other than the slots positioned at both ends of the array.

A center frequency of the electromagnetic wave may be within a range from 9.38 GHz to 9.44 GHz and the bulged portion is bulged by 1 mm to 4 mm.

The plurality of radiating slots may be arranged two-dimensionally.

The feeding slot array direction may be oriented in a direction orthogonal to the center axis of the radiation part.

The slot antenna may further include a radome for accommodating the radiation part, the feeding part, and the power guiding part therein.

The radome may have a substantial cylindrical shape, and the feeding part and the power guiding part may be arranged in parallel to the center axis of the radome and in at least one of a position at the center axis and a position near the center axis of the radome.

The slot antenna may further include a feeding waveguide arranged in parallel to the center axis of the radiation part and for guiding the power to the power guiding part from the outside of the power guiding part.

The slot antenna may further include a coaxial connector having an inner conductor and an outer conductor and for feeding the power from the feeding waveguide to the power guiding part.

The inner conductor may protrude inside the feeding waveguide.

The feeding waveguide may have a rectangular shape in cross-section, and a pair of opposing sides of the feeding waveguide in the cross-section in parallel to the array direction of the radiating slots has a length shorter than the length of the other pair of sides.

According to another aspect of the invention, a radar device is provided, which includes a slot antenna, an electromagnetic wave generating module for generating the electromagnetic wave to be supplied to the slot antenna, a rotation module for rotating the slot antenna so that the center axis of the radiation part horizontally rotates, and a received signal processing module for receiving an echo signal of the electromagnetic wave reflected on a reflection body and detecting the reflection body. The slot antenna includes a tubular electromagnetic wave radiation part having a hollow space, a plurality of electromagnetic wave radiating slots for radiating electromagnetic waves being formed in at least a part of a side surface of the radiation part and a plurality of feeding slots for being inputted with the electromagnetic waves being arrayed in line in another part of the side surface opposing to the radiating slots, a feeding part having a hollow space, extending along the feeding slot array, and for feeding power from the outside of the radiation part to the feeding slot, and a power guiding part having a hollow space and for guiding the power to the feeding part, the power guiding part extending in a direction orthogonal to the array direction of the feeding slots and in parallel to the center axis of the radiation part from a location of the feeding part corresponding to at least one of the feeding slots.

Thereby, a radar device which allows a size reduction can be manufactured.

A bulged portion may be formed in at least a portion of an inner wall of the feeding part opposing to the feeding slot so that the portion of the feeding part is bulged more than an inner wall of the power guiding part facing the same side as the inner wall of the feeding part.

A center frequency of the electromagnetic wave may be within a range from 9.38 GHz to 9.44 GHz and the bulged portion is bulged by 1 mm to 4 mm.

The plurality of radiating slots may be arranged two-dimensionally.

The feeding slot array direction may be oriented in a direction orthogonal to the center axis of the radiation part.

The radar device may further include a radome for accommodating the radiation part, the feeding part, and the power guiding part therein.

The radome may have a substantial cylindrical shape, and the feeding part and the power guiding part may be arranged in parallel to the center axis of the radome and in at least one of a position at the center axis and a position near the center axis of the radome.

As described above, according to the present invention, a slot antenna, and a radar device of compact size can be provided, which allow an electromagnetic wave to propagate in an appropriate mode pattern within a radiation waveguide.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Hereinafter, one embodiment of the invention is described in detail with reference to the accompanying drawings.

Figure 1:
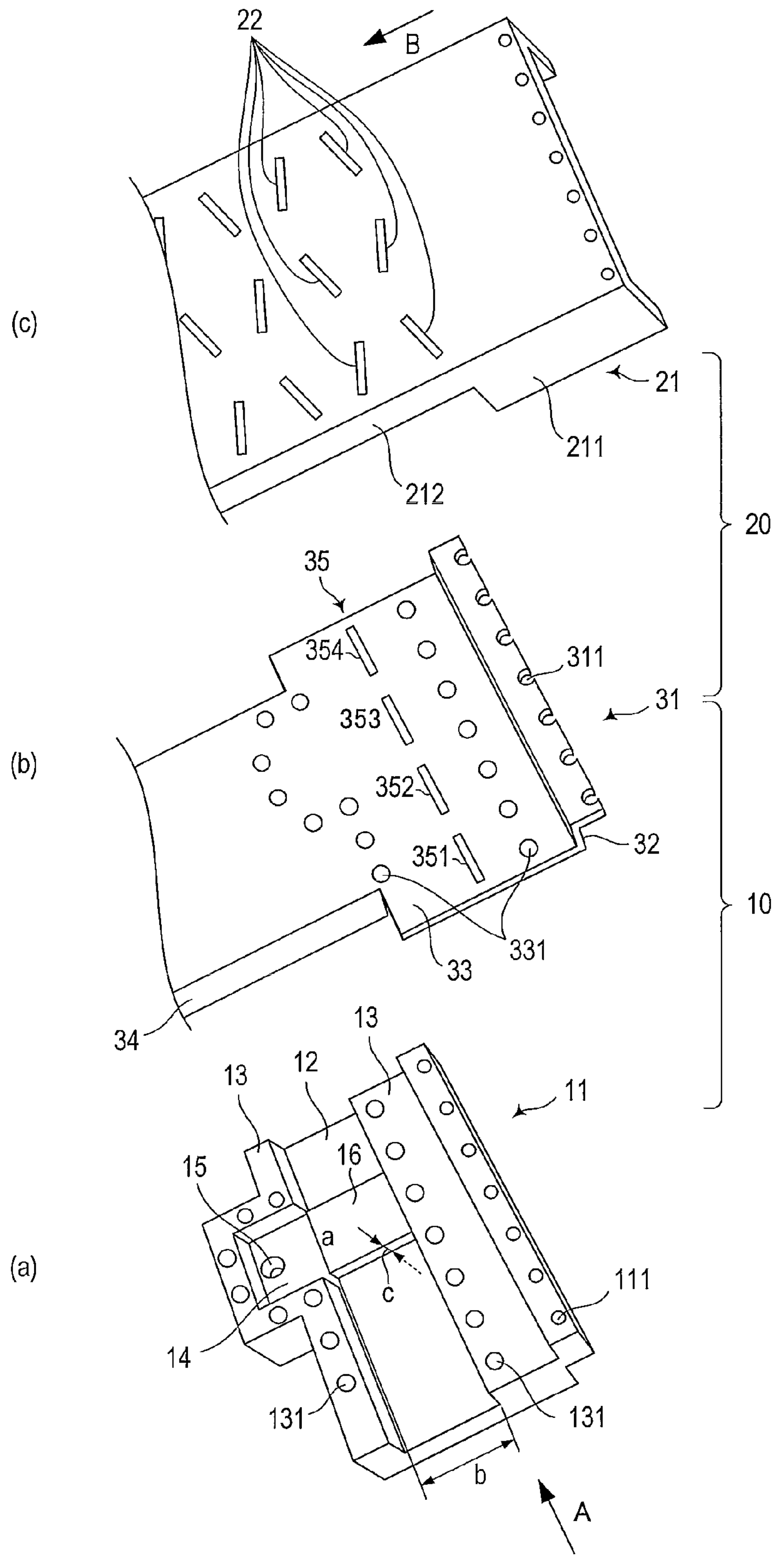
FIG. 1 is an exploded view illustrating a configuration of a slot antenna according to one embodiment of the present invention.

FIG. 1 is an exploded view illustrating a configuration of a slot antenna according to this embodiment of the present invention. The slot antenna is constituted with a feeding part structure 10 and a radiation part structure 20 as shown in FIG. 1. The radiation part structure 20 is for radiating an electromagnetic wave, which is propagated through an internal cavity formed by components such as a radiation waveguide structure body 21, outside toward a designated direction. The feeding part structure 10 is for guiding (feeding) a required electromagnetic wave into the radiation waveguide structure body 21.

Hereinafter, structures of the feeding part structure 10 and the radiation part structure 20 are described in detail below with reference to FIG. 1. The feeding part structure 10 includes a feeding waveguide structure body 11 and a plate 31 which constructs a part of a side wall of the internal cavity. The feeding part structure 10 is constructed by the feeding waveguide structure body 11 and the plate 31 positioned against each other. The feeding waveguide structure body 11 and the plate 31 are made of a conductive material such as aluminum.

The feeding waveguide structure body 11 is a substantially rectangular parallelepiped shape and formed with a U-shaped cross-sectional groove section 12 with a necessary dimension along a longitudinal direction (direction in parallel to the arrow "A" in FIG. 1) of the body 11. Note that, the groove section 12 functions as a feeding cavity. Further, a middle plane 13 is formed on both sides of the groove section 12 in a direction orthogonal to the longitudinal direction. Each of the middle planes 13 functions as a recipient surface when the plate 31 is covered from the top as described later.

Figure 3:
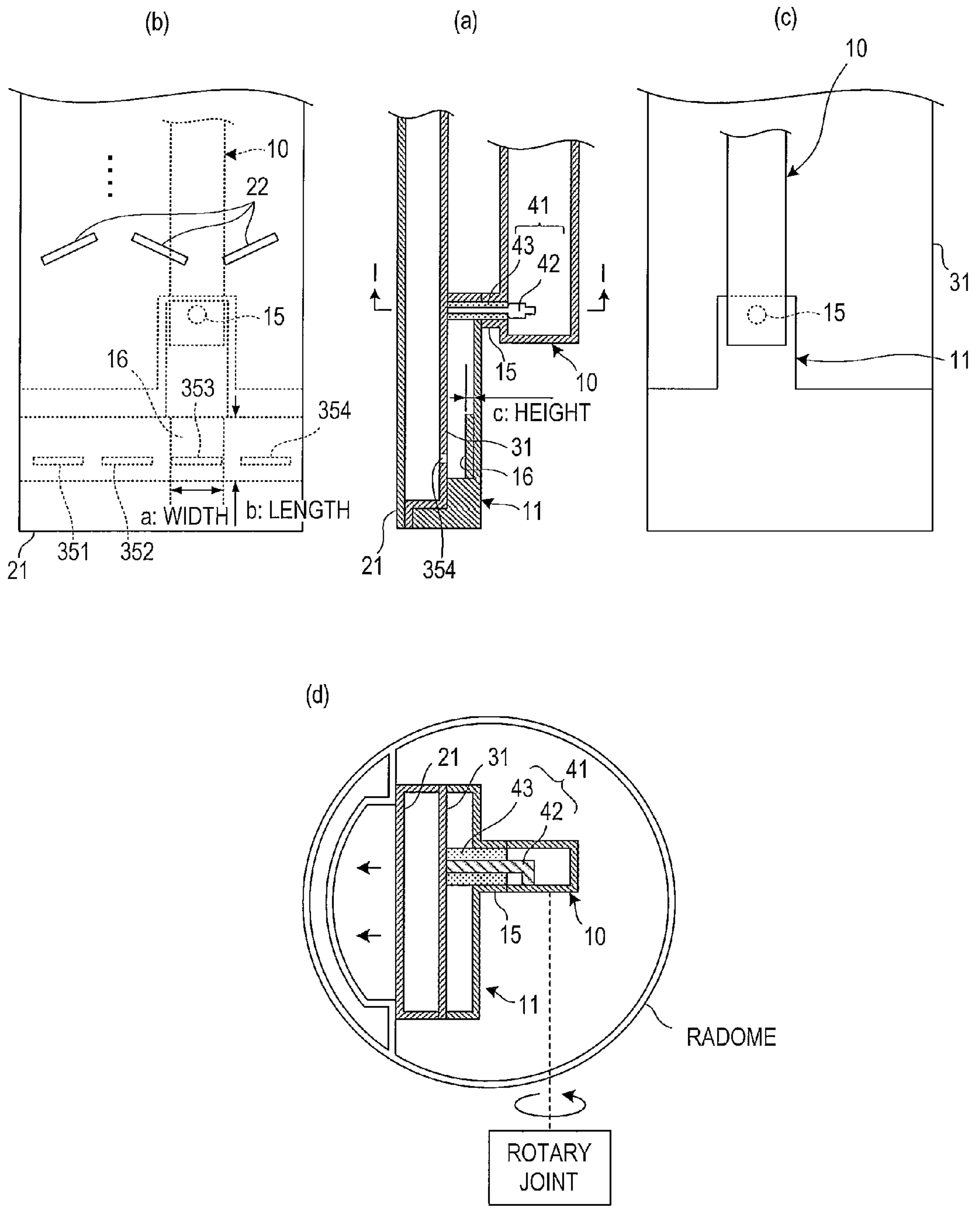
FIG. 3 is detailed structure views illustrating a feeding part structure and its peripherals of the slot antenna in order to illustrate coupling characteristics, in which the part (a) of FIG. 3 is a plan view, the parts (b) and (c) are side views, and the part (d) of FIG. 3 is a cross-sectional view I-I of (a) of FIG. 3, where the feeding part structure and its peripherals are accommodated in a radome.

A recessed section 14 having a necessary width in a part along the longitudinal direction of the groove section 12 and a necessary length along a direction orthogonal to the longitudinal direction is continuously formed from the groove section 12. The recessed section 14 has the same depth as the groove section 12 and forms a rectangular parallelepiped shaped input cavity. At an appropriate location of a bottom surface of the recessed section 14, a hole 15 with a necessary diameter is bored through toward the bottom. As shown in FIG. 3, the hole 15 is inserted, for example, with a coaxial connector 41 (omitted in FIG. 1) for inputting a microwave from outside into the recessed section 14. The coaxial connector 41 is constituted with a metal probe 42 for excitation and a cylindrical insulation material 43, such as Teflon®, on the perimeter of the metal probe 42. Note that, the hole 15 is arranged in a position within the recessed section 14 where the microwave can match at a frequency to be used and a standing wave can be formed in the groove section 12. Further, the base end of the coaxial connector 41 is arranged so it is exposed within a waveguide. Thereby, the microwave (an electromagnetic wave) generated by a microwave generator, such as a magnetron or a semiconductor oscillator, is directed through this waveguide to the coaxial connector 41.

The waveguide is arranged to extend in parallel to the radiation waveguide structure 21. The waveguide has a rectangular shape in cross-section, and a pair of opposing sides of the feeding part structure 10 in the cross-section in parallel to the array direction of the radiating slots has a length shorter than the length of the other pair of sides.

In at least a part of the groove section, a convex step 16 (bulged portion) having a predetermined shape is formed in a section corresponding to the recessed section 14. Note that, the feeding waveguide structure body 11 can be manufactured by first machining down to the top of the step 16, and followed by machining down the other areas except for the step 16, that is machining the groove section 12 and the recessed section 14 down to a necessary depth. Alternatively, forming the groove section 12 first, then followed by forming the step 16 by setting a predetermined conductive material to the groove section 12 is an acceptable method. In this embodiment, the shape of the step 16 is set to be a rectangular parallelepiped shape. That is, as shown in the part (a) of FIG. 1, each dimension of the step is represented as: the length dimension=b, the width dimension=a (i.e., the direction orthogonal to the length), and the thickness (height) dimension=c.

The top portions of the feeding waveguide structure body 11 and the middle planes 13 have a required number of mounting holes 111 and 131 formed respectively.

In the plate 31, an inverted L-shaped bent section 32 is formed at one end of the length directions. Further, in the plate 31, a flat plate section 33 is formed in the length direction from the bent section 32, and a side surface section 34 is continuously formed by bending both ends of the plate section 33 in the width direction.

Note that, the feeding part is constituted with the groove section 12 and the step 16 of the feeding waveguide structure body 11, the plate 31, and slots 351-354 on the plate; and the input part is constituted with the recessed section 14 and the hole 15 of the feeding waveguide structure body 11, and the plate 31.

In this embodiment, at a predetermined position on the flat plate section 33 in the length direction, a slot 35 including the four slots 351-354 are linearly arranged in the width direction at a required interval. The slots 351-354 have the same shape and are formed by, for example, a punching process at positions corresponding to the groove section 12. In this embodiment, the slot 353 is arranged so that its position is correspondent to the step 16. In this manner, the recessed section 14 is arranged corresponding to either one of the inner slots 352 and 353 (slot at either ends 351 and 354 excluded), and thereby, it becomes possible to adopt a structure in which an electromagnetic wave splits into the directions along which the slots are aligned, and becomes easier to attain matching of the electromagnetic wave, and becomes possible to eliminate the deterioration (disorder) of a propagation mode as much as possible during feeding. Note that the relationship between a matching state and each dimension of the step (a, b and c) is described later.

Further, the plate 31 is formed with mounting holes 311 on the top portion side of the bent section 32 and mounting holes 331 in the flat plate section 33, and, therefore, it can be fastened with the feeding waveguide structure body 11 by means of fastening members such as screws. As a result, the recessed section 14 and the groove section 12 are enclosed by the flat plate section 33, thus constructing the waveguide as the input cavity and the feeding cavity. Further, a standing wave is generated inside the feeding cavity by utilizing a bent section 211 (described later) of the radiation waveguide structure body 21, or, for example, by arranging a short circuit component at both ends along the direction of slot arrangement.

Here, the behavior of an electromagnetic wave inputted by the coaxial connector 41 is described. The electromagnetic wave transmitted through the coaxial connector 41 is radiated from the recessed section 14 and proceeds to the groove section 12. The electromagnetic wave is re-directed into both side directions of the slot arrangement in parallel to the arrow "A" in the part (a) of FIG. 1 without its shape of mode not substantially disordered by the shapes of the groove section 12 and the step 16, and further moves to each of the slots 351-354. Then, the uniform electromagnetic waves propagate to the radiation waveguide structure body 21 side through each of the slots 351-354.

The radiation part structure 20 is constituted with the radiation waveguide structure body 21 and the plate 31 arranged in parallel to each other via a necessary space. The radiation waveguide structure body 21 and the plate 31 have a predetermined length in the length direction (propagation direction of electromagnetic wave) indicated by the arrow "B" in the part (c) of FIG. 1 and form a tubular cavity between them, which serves as an antenna waveguide. Note that, the radiation waveguide structure body 21 is made of a conductive material such as aluminum. Further, the radiation waveguide structure body 21 is constituted with a radiation surface(s) by forming radiating slots 22 which are arranged two-dimensionally at least on one surface simply by, for example, a punching process. The radiating slots 22 are formed with a predetermined number of slots in the width direction (the direction A which is orthogonal to the direction B to which the electromagnetic wave propagates). In this embodiment, three radiating slots are formed in the width direction where they are alternately angled in a direction opposite to each other. The radiating slots 22 are arranged with a predetermined spacing, for example half of a wave length within the cavity, toward the direction B of electromagnetic wave propagation. Thereby, an electromagnetic wave with TEn0 mode propagates inside the radiation part structure 20, and is radiated from the respective radiating slots 22 having necessary directionality. Note that a bent section 212 with a smaller dimension from the radiation surface than the bend section 211 is continuously formed in the propagation direction B from the bent section 211 of the radiation waveguide structure body 21. The bent section 212 is used to be attached with the flat plate 33 of the plate 31 via a predetermined space, between which an antenna internal cavity is formed. In this way, the electromagnetic wave, which is the microwave inputted from the coaxial connector 41, is guided through the slots 351-354, to the radiation waveguide structure body 21, and propagates toward the propagation direction B within the antenna internal cavity. Then, the electromagnetic wave obtains necessary directionality by each slot and radiated to an outside direction orthogonal to the radiation surface.

In this embodiment, the waveguide, the feeding part structure 10, and the radiation part structure 20 are arranged inside a radome for accommodating the feeding part structure 10 and the radiation part structure 20 and rotating in a horizontal plane. The radome has a substantially tubular shape, and the waveguide, the feeding part structure 10, and the radiation part structure 20 are arranged in parallel to the center axis of the radome and in at least one of a position at the center axis and a position near the center axis of the radome.

Figure 2:
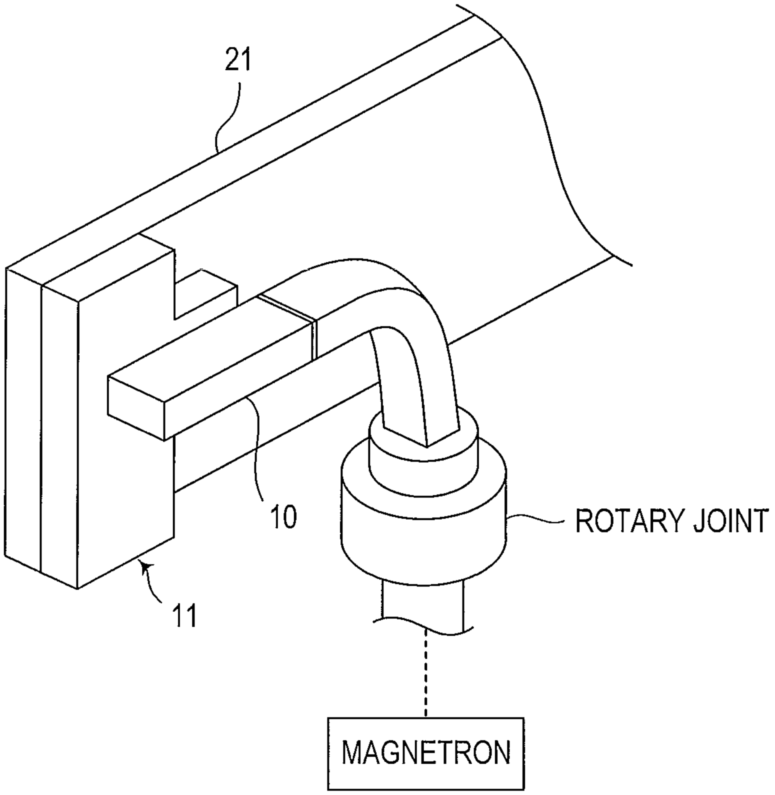
FIG. 2 is an external perspective view illustrating one example of a configuration of the slot antenna.
Figure 4:
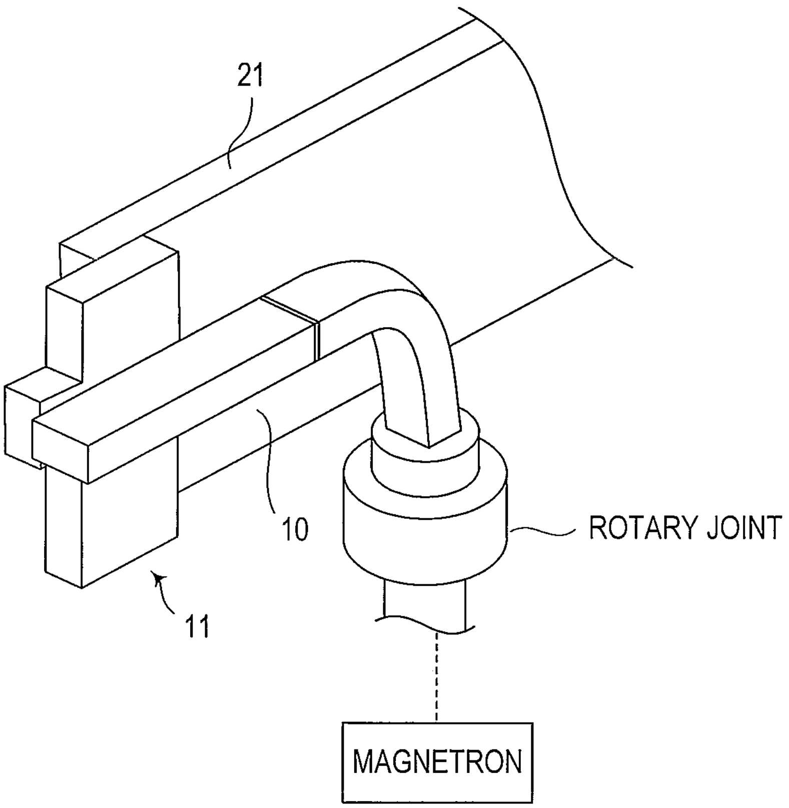
FIG. 4 is an external perspective view illustrating another example of a configuration of the slot antenna.
Figure 5:
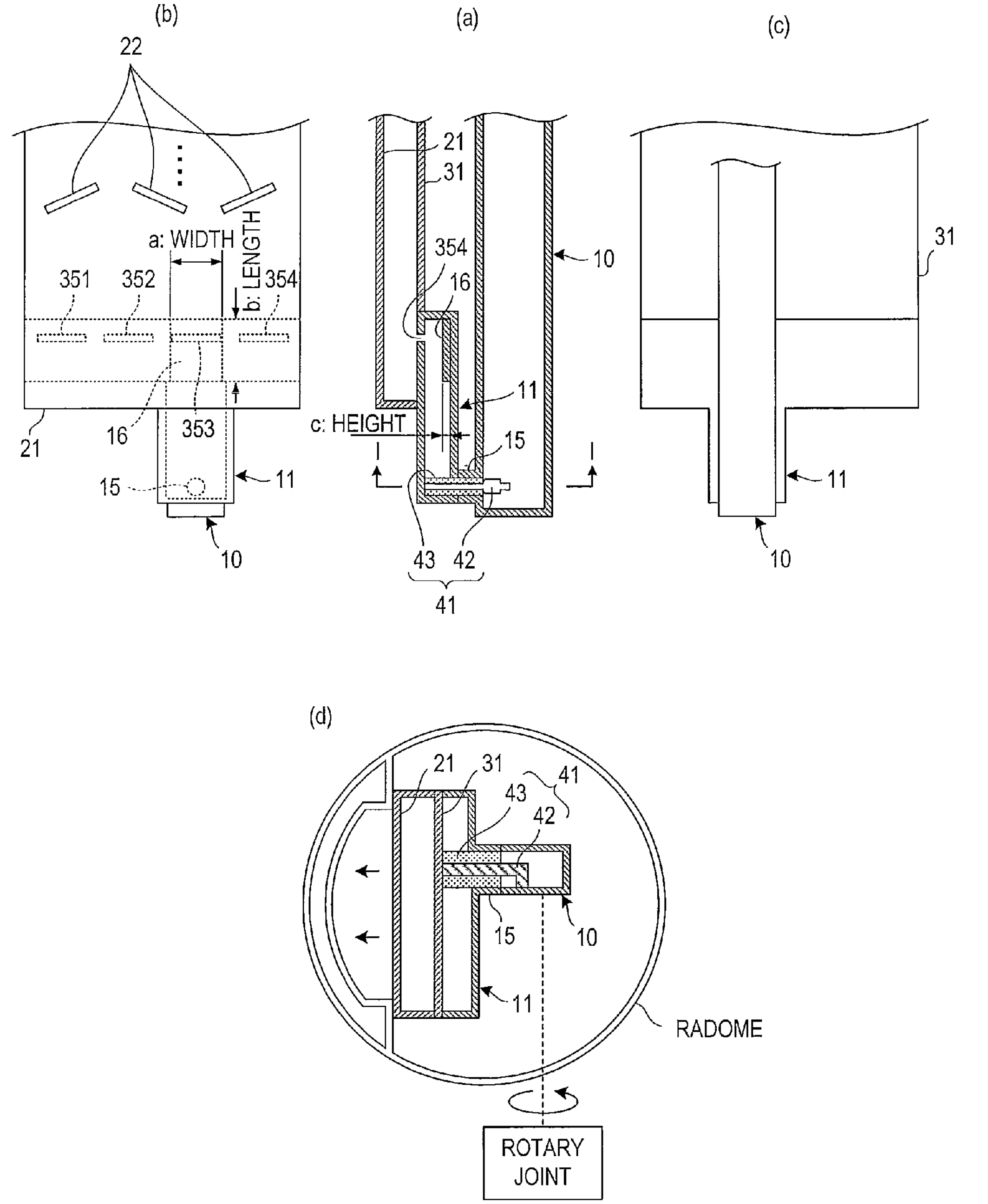
FIG. 5 is detailed structure views illustrating the example of the feeding part structure and its peripherals of the slot antenna in order to illustrate coupling characteristics, in which the part (a) of FIG. 5 is a plan view, the parts (b) and (c) of FIG. 5 are side views, and the part (d) of FIG. 5 is a cross-sectional view I-I of (a) of FIG. 5, where the feeding part and its peripherals are accommodated in the radome.

FIG. 2 is an external perspective view illustrating one example of a configuration of the slot antenna. FIG. 3 is detailed structure views illustrating a feeding part structure and its peripherals of the slot antenna in order to illustrate coupling characteristics, in which the part (a) of FIG. 3 is a plan view, the parts (b) and (c) are side views, and the part (d) of FIG. 3 is a cross-sectional view I-I of (a) of FIG. 3, where the feeding part structure and its peripherals are accommodated in the radome. FIG. 4 is an external perspective view illustrating another example of a configuration of the slot antenna. FIG. 5 is detailed structure views illustrating another example of the feeding part structure and its peripherals of the slot antenna in order to illustrate coupling characteristics, in which the part (a) of FIG. 5 is a plan view, the parts (b) and (c) of FIG. 5 are side views, and the part (d) of FIG. 5 is a cross-sectional view I-I of (a) of FIG. 5, where the feeding part and its peripherals are accommodated in the radome. Note that in FIGS. 2 through 5, the structure sections also shown in FIG. 1 have the same reference numerals and symbols, and are omitted in description. The difference of the structure illustrated in FIGS. 4 and 5 from that in FIGS. 2 and 3 is a structure where the feeding waveguide structure body 11 is arranged in the opposite direction with respect to the radiation waveguide structure body 21, the plate 31, and the feeding part structure 10, and the coaxial connector 41 is exposed within the end side of the feeding part structure 10 compared to the FIGS. 2 and 3. Note that, although the structure in FIGS. 2 and 3 is preferred for practical use in sight of size reduction, characteristically there is no substantial difference between the two structures.

In this embodiment, as shown in the part (d) of FIG. 3 and the part (d) of FIG. 5, some of the components (e.g., the radiation waveguide structure body 21, the plate 31, and the feeding waveguide structure body 11) which have comparatively longer width among all the components in the radome are arranged to be offset from the center axis of the radome. However, those components with comparatively longer width may preferably be arranged as closer as possible to the center axis of the radome, thereby, the diameter of the radome can be reduced.

In FIGS. 1, 3 and 5, the factors (parameters) for achieving a high electromagnetic wave matching are set as follows; the width dimension a for the step 16, the length dimension b for the step 16, and the height dimension c (from the bottom of the groove section 12) for the step 16.

FIGS. 6 through 24 are views and charts illustrating results of simulation tests for each characteristic when each parameter is suitably changed. In this embodiment, the microwave frequency used is: the center frequency is 9.41 GHz and the zone is between 9.38 GHz to 9.44 GHz. In each frequency, the dimensions a, b and c are set as; the width a=17.5 mm, the length b=22.9 mm, and the height c=3 mm. Note that the longitudinal size of the wavelength within the waveguide cross section corresponding to the frequency 9.41 GHz is 22.2 mm which is set somewhat larger for a waveguide of a feeding part so that the microwave within the range can pass through in a suitable manner.

FIGS. 6 through 12 are views illustrating states of a waveguide propagation mode with the width a=17.5 mm and the length b=22.9 mm remaining the same while the height c is changed from 0 mm, 1 mm, 2 mm, 3 mm, 4 mm, 5 mm, and 6 mm.

Figure 6:
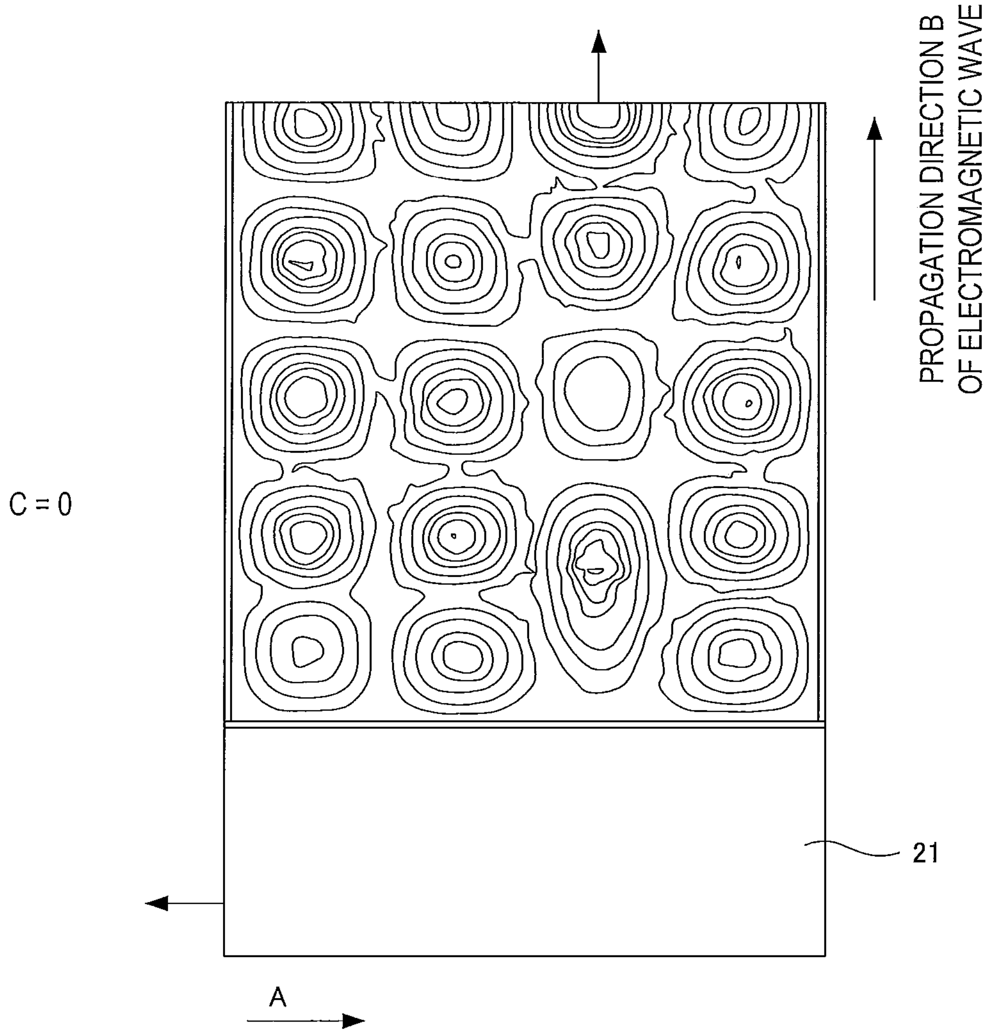
FIG. 6 is a view illustrating a state of waveguide propagation mode wherein: width a=17.5 mm and length b=22.9 mm (fixed), and height c=0 mm.

FIG. 6 illustrates the case when c=0 mm, in which the shape of the first magnetic field loop, whose position corresponds to the step 16, is significantly deteriorated toward the propagation direction of the electromagnetic wave. Further, each magnetic field component shows various intensity, and it is ununiform toward the direction B especially at the position where corresponds to the step 16.

Figure 7:
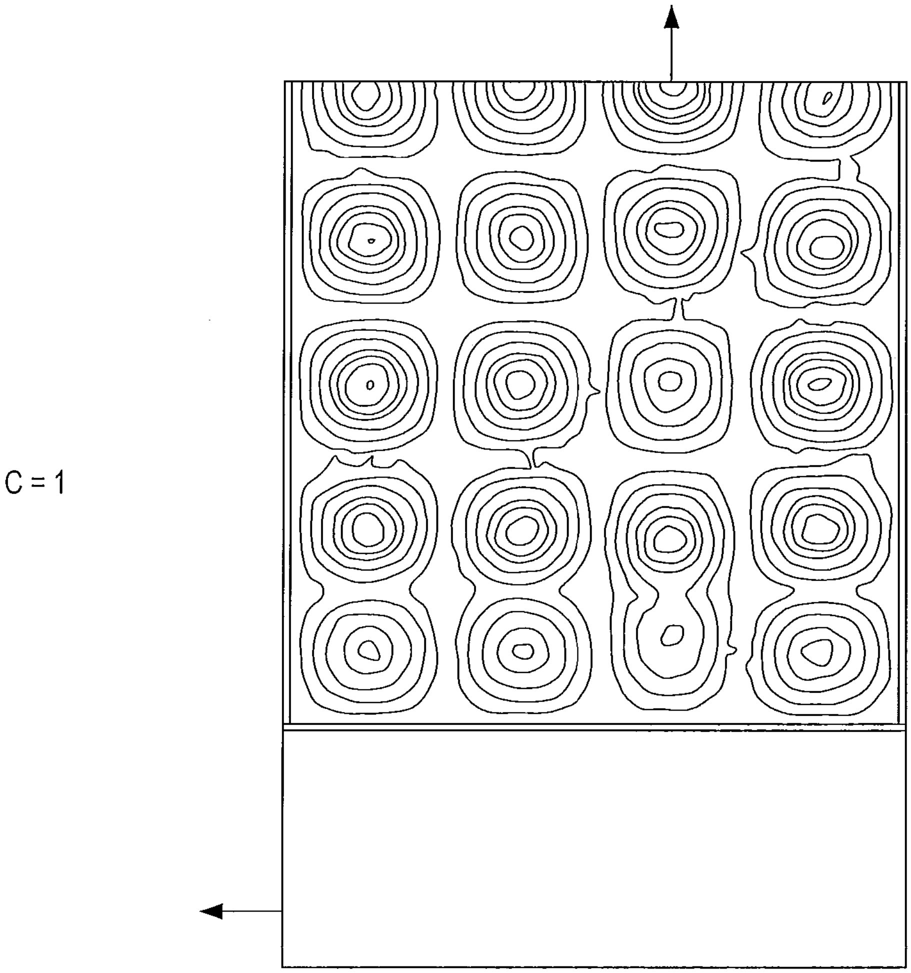
FIG. 7 is a view illustrating a state of waveguide propagation mode wherein: width a=17.5 mm and length b=22.9 mm (fixed), and height c=1 mm.

FIG. 7 illustrates the case when c=1 mm, in which the shape of the first magnetic field loop, whose position corresponds to the step 16, is slightly deteriorated in the propagation direction of the electromagnetic wave. Therefore, similar to the case shown in FIG. 6, each magnetic field component shows various intensity, and it is ununiform toward the direction B especially at the position where corresponds to the step 16.

Figure 8:
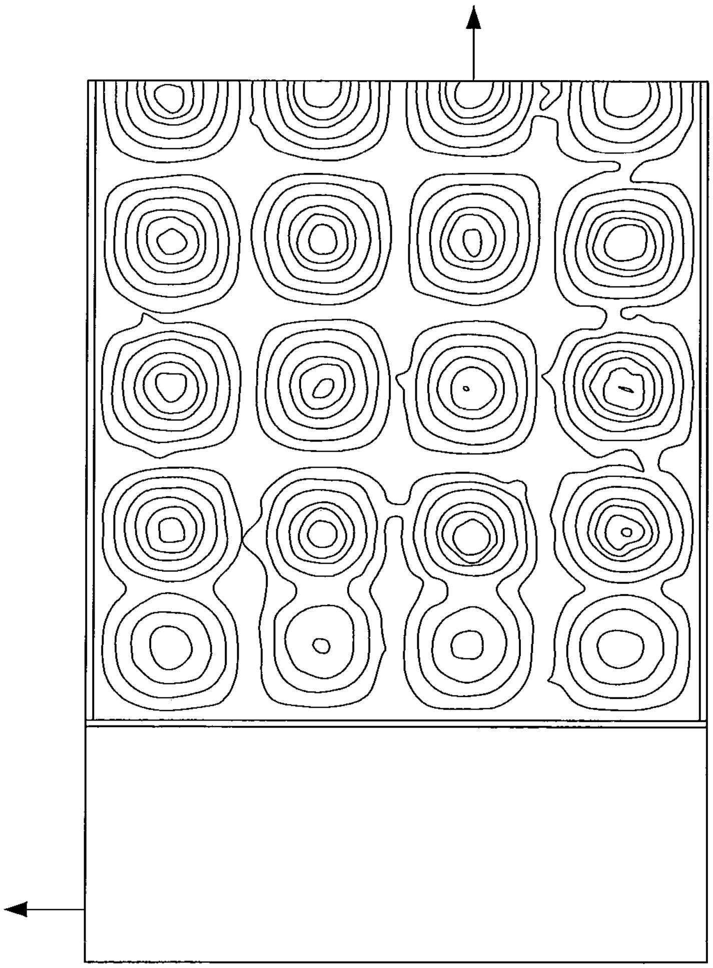
FIG. 8 is a view illustrating a state of waveguide propagation mode wherein: width a=17.5 mm and length b=22.9 mm (fixed), and height c=2 mm.

FIG. 8 illustrates the case when c=2 mm, in which the shapes of the first magnetic field loops, whose position corresponds and positions are adjacent to the step 16, are slightly deteriorated in the propagation direction of the electromagnetic wave. On the other hand, each magnetic field component shows not so much variation in intensities, and the ununiformity toward the direction B at the position where corresponds to the step 16 is significantly reduced.

Figure 9:
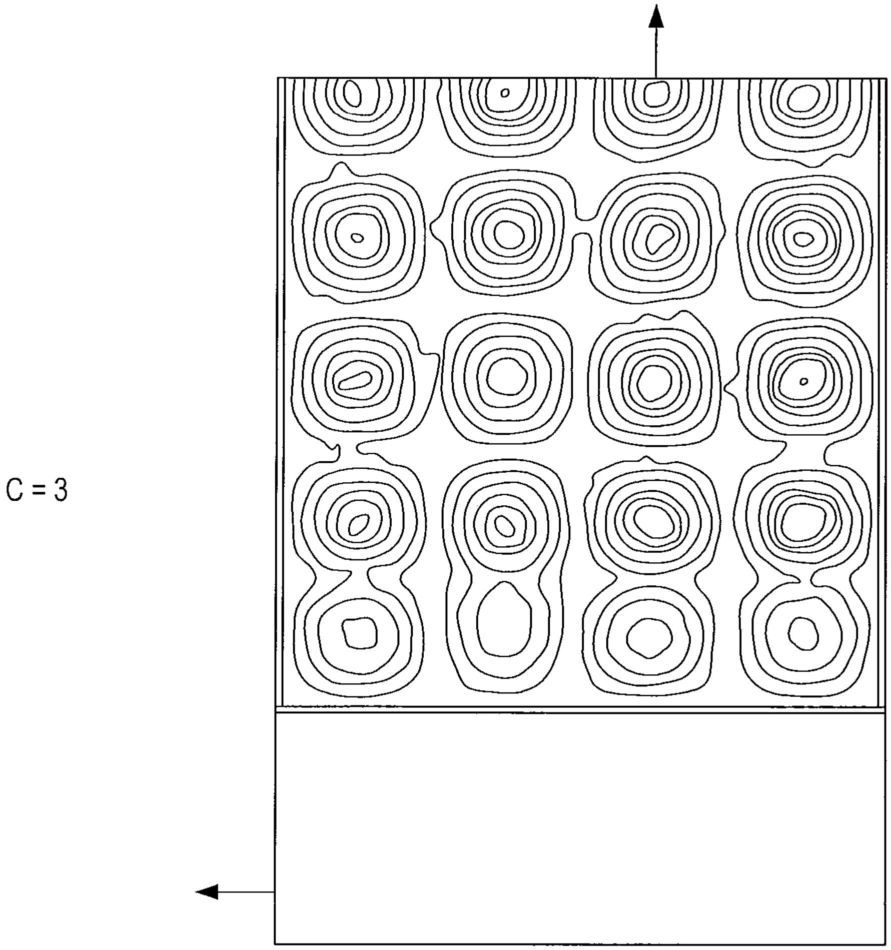
FIG. 9 is a view illustrating a state of waveguide propagation mode wherein: width a=17.5 mm and length b=22.9 mm (fixed), and height c=3 mm.

FIG. 9 illustrates the case when c=3 mm, in which the shapes of the first magnetic field loops, whose position corresponds and positions are adjacent to the step 16, are slightly deteriorated in the propagation direction of the electromagnetic wave. On the other hand, each magnetic field component shows not so much variation in intensity, and the ununiformity toward the direction B at the position where corresponds to the step 16 is significantly reduced.

Figure 10:
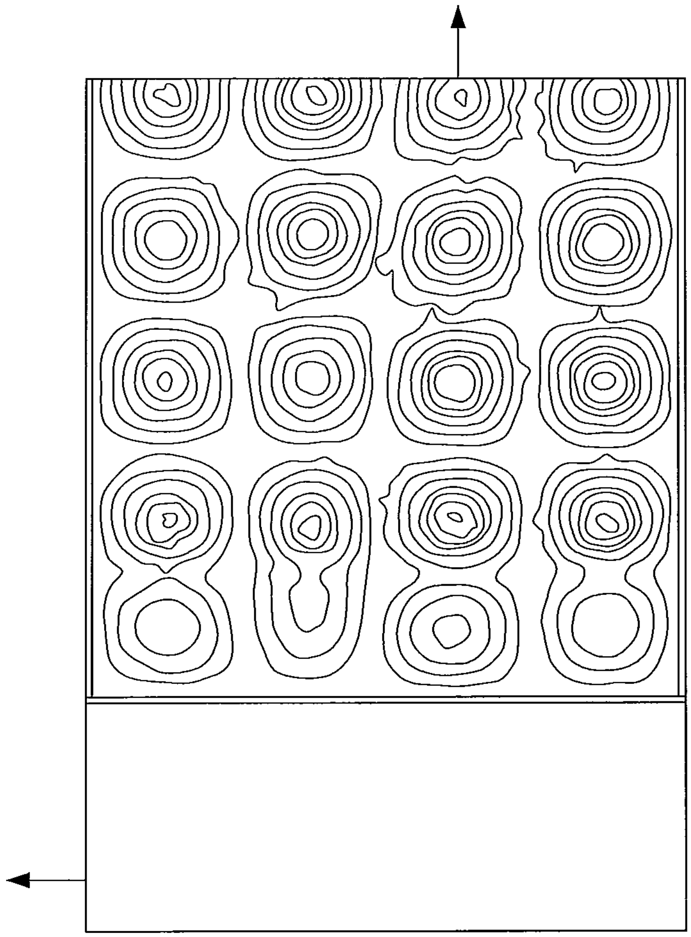
FIG. 10 is a view illustrating a state of waveguide propagation mode wherein: width a=17.5 mm and length b=22.9 mm (fixed), and height c=4 mm.

FIG. 10 illustrates the case when c=4 mm, in which the shapes of the first magnetic field loops, whose position corresponds and positions not correspond to the step 16, are slightly deteriorated in the propagation direction of the electromagnetic wave. Therefore, similar to the case shown in FIG. 7, each magnetic field component shows variation in intensity, and it is ununiform toward the direction B especially at the position where corresponds to the step 16.

Figure 11:
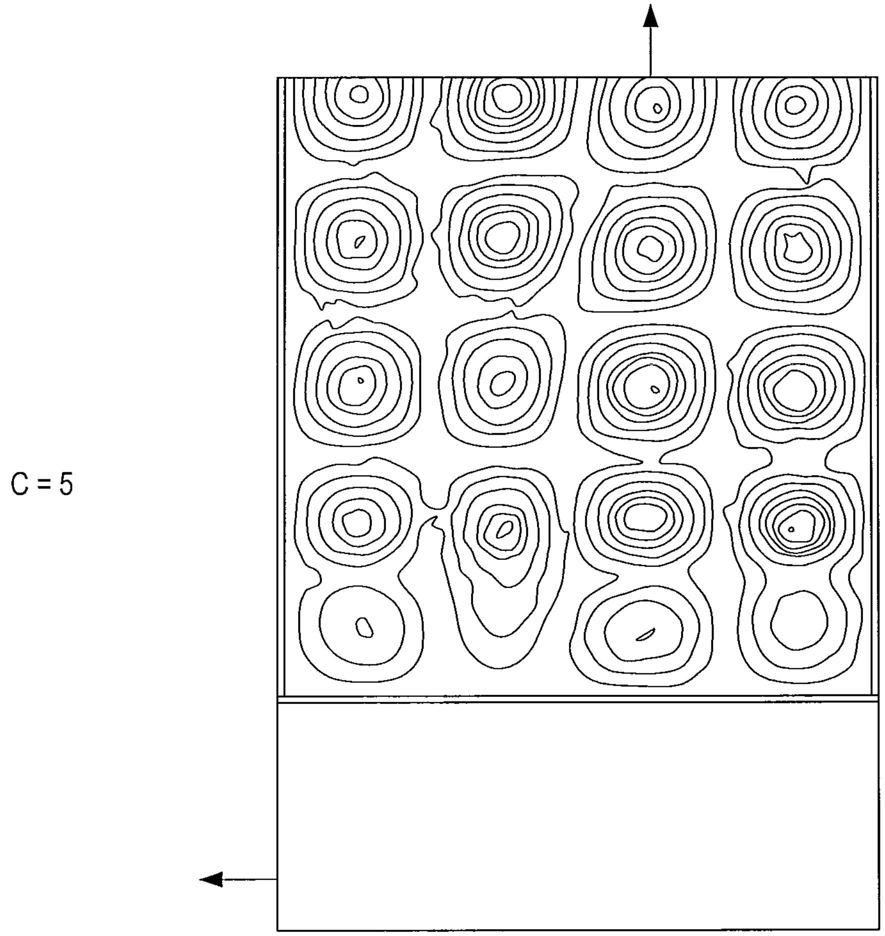
FIG. 11 is a view illustrating a state of waveguide propagation mode wherein: width a=17.5 mm and length b=22.9 mm (fixed), and height c=5 mm.

FIG. 11 illustrates the case when c=5 mm, in which the shapes of the first magnetic field loops, whose position corresponds and positions not correspond to the step 16, are significantly deteriorated toward the propagation direction of the electromagnetic wave. Further, each magnetic field component shows various intensity, and it is ununiform toward the direction B especially at a position where corresponds to a step 16.

Figure 12:
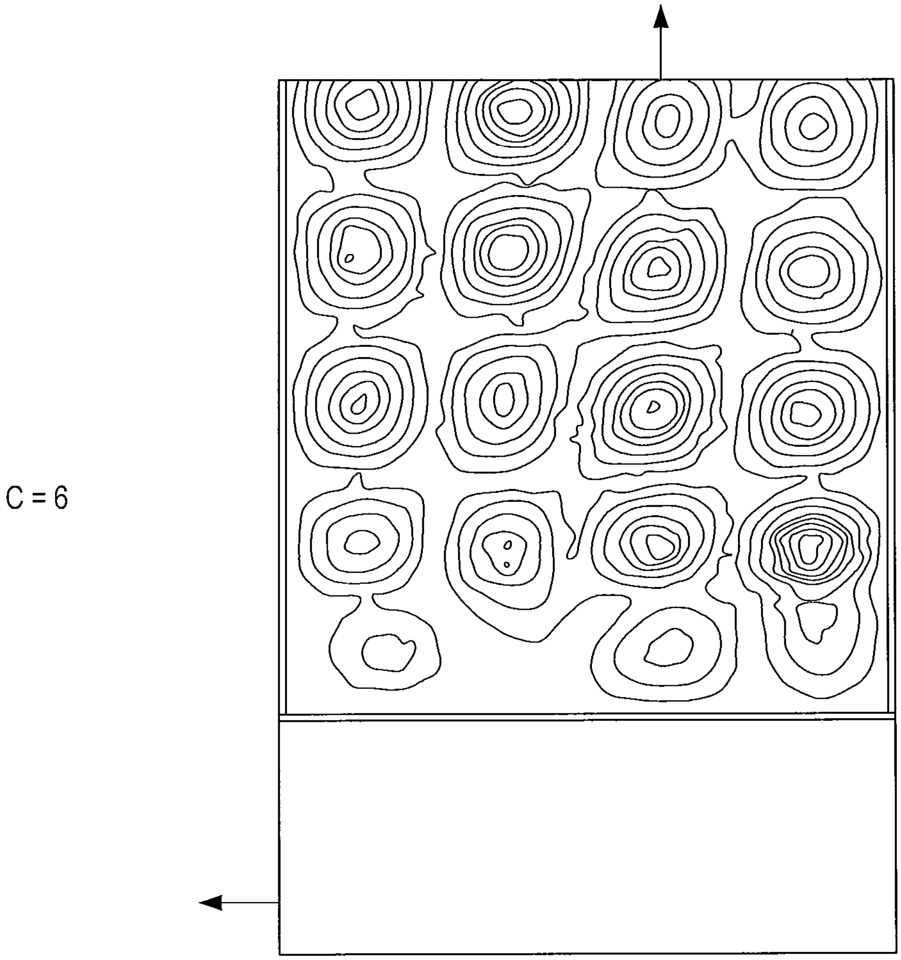
FIG. 12 is a view illustrating a state of waveguide propagation mode wherein: width a=17.5 mm and length b=22.9 mm (fixed), and height c=6 mm.

FIG. 12 illustrates the case when c=6 mm, in which the shapes of the first magnetic field loops, whose position corresponds and positions not correspond to the step 16, are significantly deteriorated toward the propagation direction of the electromagnetic wave. Further, each magnetic field component shows various intensity, and it is ununiform toward the direction B especially at the position where corresponds to a step 16.

Figure 13:
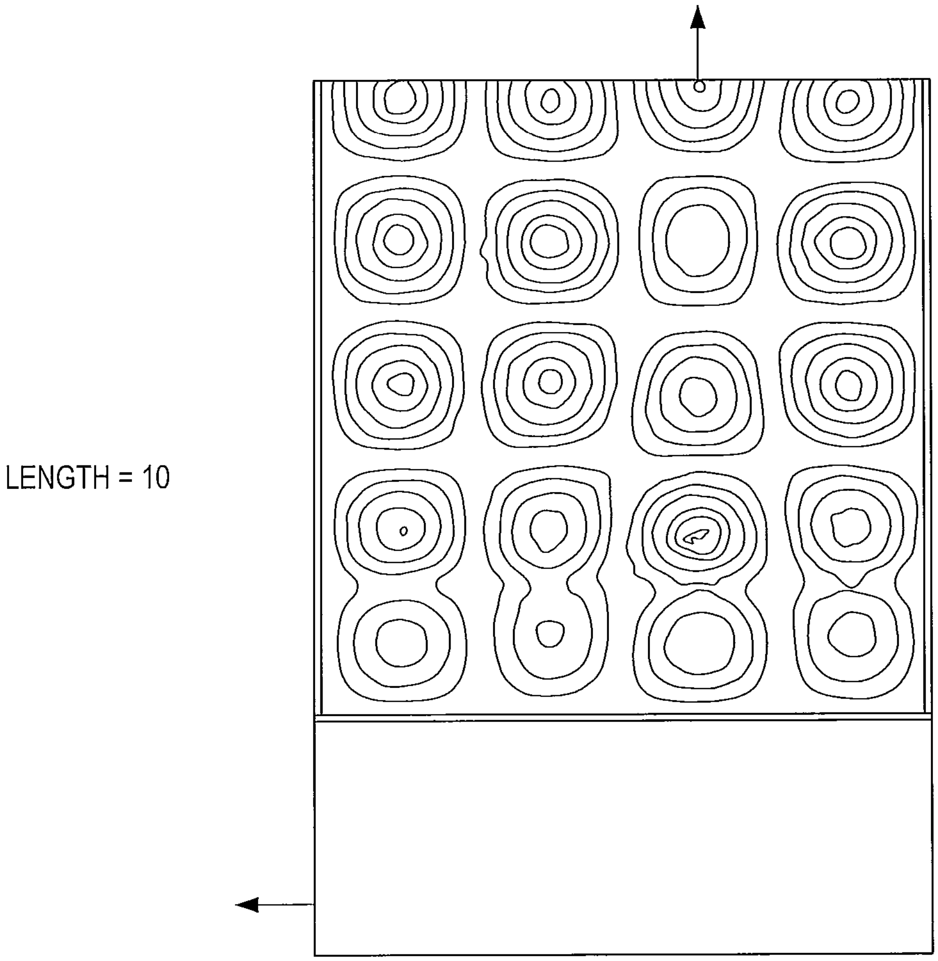
FIG. 13 is a view illustrating a state of waveguide propagation mode wherein: width a=17.5 mm and height c=3 mm (fixed), and length b=10 mm.
Figure 14:
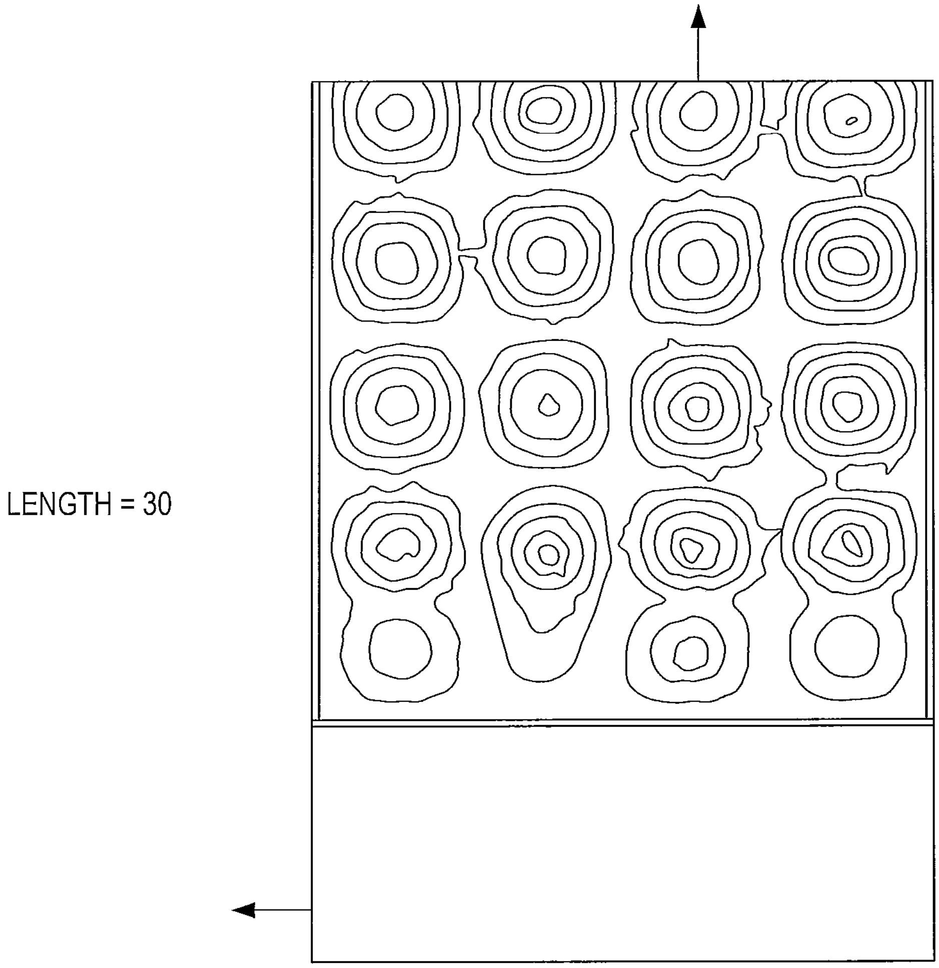
FIG. 14 is a view illustrating a state of waveguide propagation mode wherein: width a=17.5 mm and height c=3 mm (fixed), and length b=30 mm.

FIGS. 13 and 14 are views illustrating states of waveguide propagation mode with the width a=17.5 mm and the height c=3 mm remaining the same while the length b is 10 mm and 30 mm.

FIG. 13 illustrates the case when b=10 mm, in which the shapes of the first magnetic field loops, whose position corresponds and positions are adjacent to the step 16, are relatively deteriorated toward the propagation direction B. Further, each magnetic field component shows various intensity, and it is ununiform toward the direction B especially at the position where corresponds to the step 16.

FIG. 14 illustrates the case when b=30 mm, in which the shape of the first magnetic field loops, whose position corresponds and positions are adjacent to the step 16, are significantly deteriorated toward the propagation direction B, and its intensity is weak. Further, the intensity of each magnetic field component toward the direction B is weaker overall.

Figure 15:
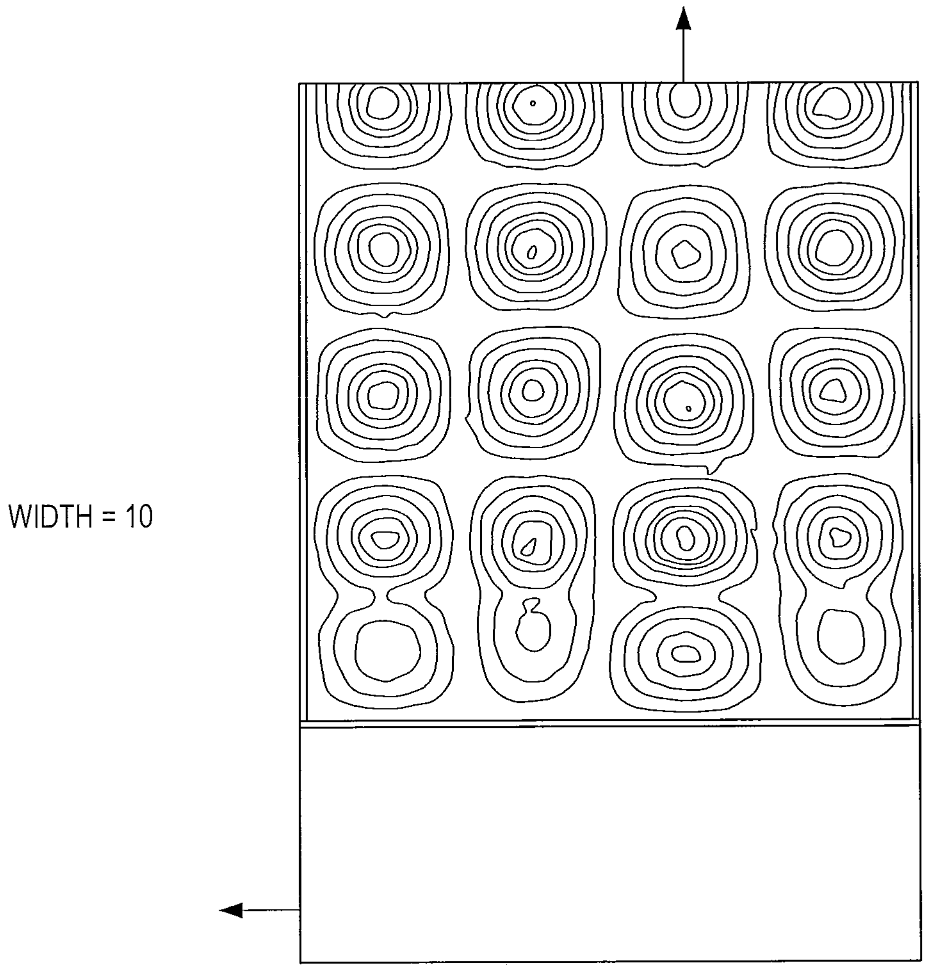
FIG. 15 is a view illustrating a state of waveguide propagation mode wherein: length b=22.9 mm and height c=3 mm (fixed), and width a=10 mm.
Figure 16:
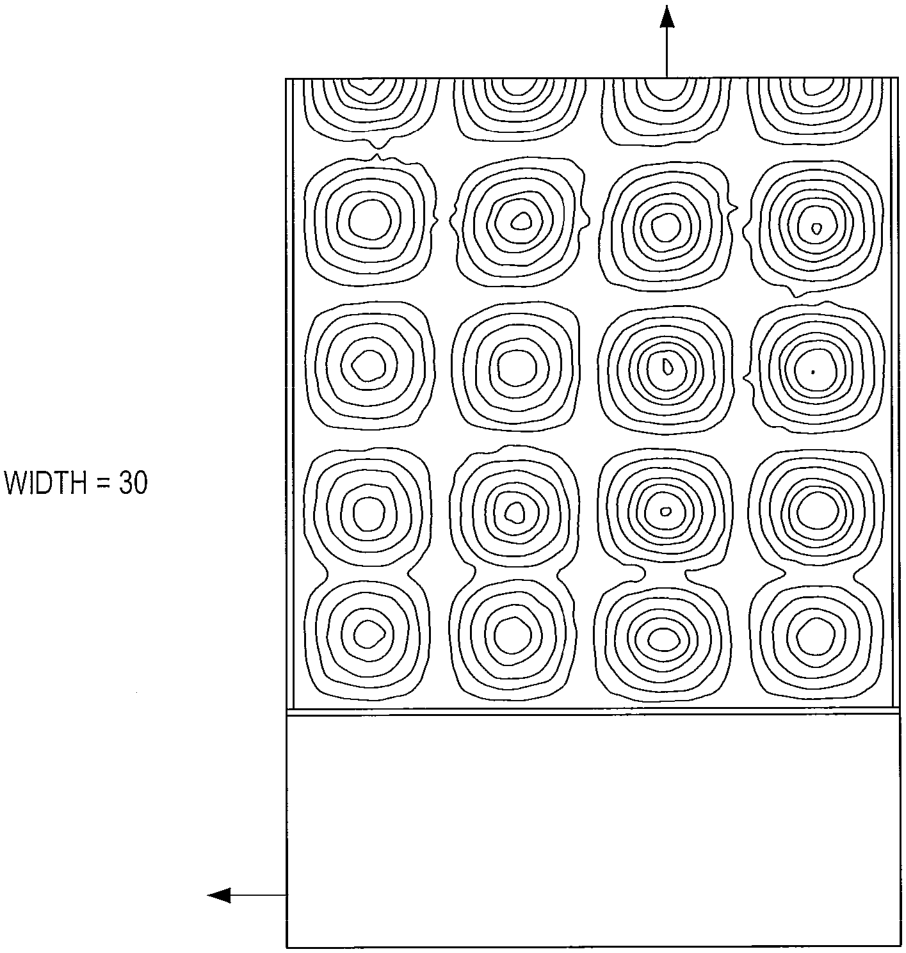
FIG. 16 is a view illustrating a state of waveguide propagation mode wherein: length b=22.9 mm and height c=3 mm (fixed), and width a=30 mm.

FIGS. 15 and 16 are views illustrating states of waveguide propagation mode with the length b=22.9 mm and the height c=3 mm remaining the same while the width a is 10 mm and 30 mm.

FIG. 15 illustrates the case when a=10 mm, in which the shape of the first magnetic field loops, whose position corresponds and positions are adjacent to the step 16, are relatively deteriorated toward the propagation direction B. Further, each magnetic field component shows various intensity, and it is ununiform toward the direction B especially at the position where corresponds to the step 16.

FIG. 16 illustrates the case when a=30 mm, in which the shape of the first magnetic field loops are not particularly deteriorated toward the propagation direction B. On the other hand, each magnetic field component shows various intensity, and it is ununiform toward the direction A orthogonal to the direction B.

Figure 17:
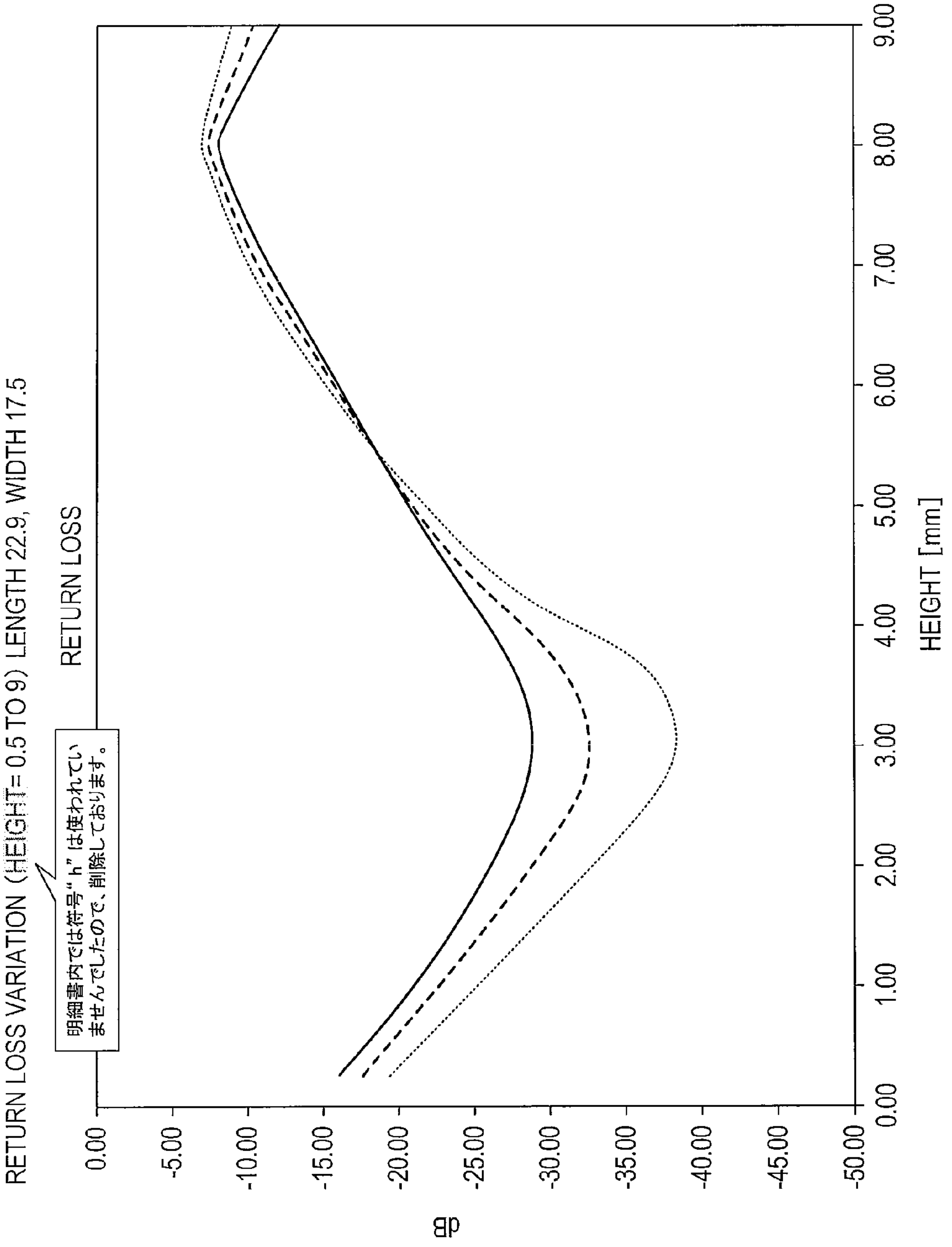
FIG. 17 is a chart illustrating return losses (ratio of reflection to an input (unit in dB)) of microwave at frequencies (9.38 GHz, 9.41 GHz, 9.44 GHz) wherein: width a=17.5 mm, length b=22.9 mm, and height c is varied from 0.5 to 9 mm.
Figure 18:
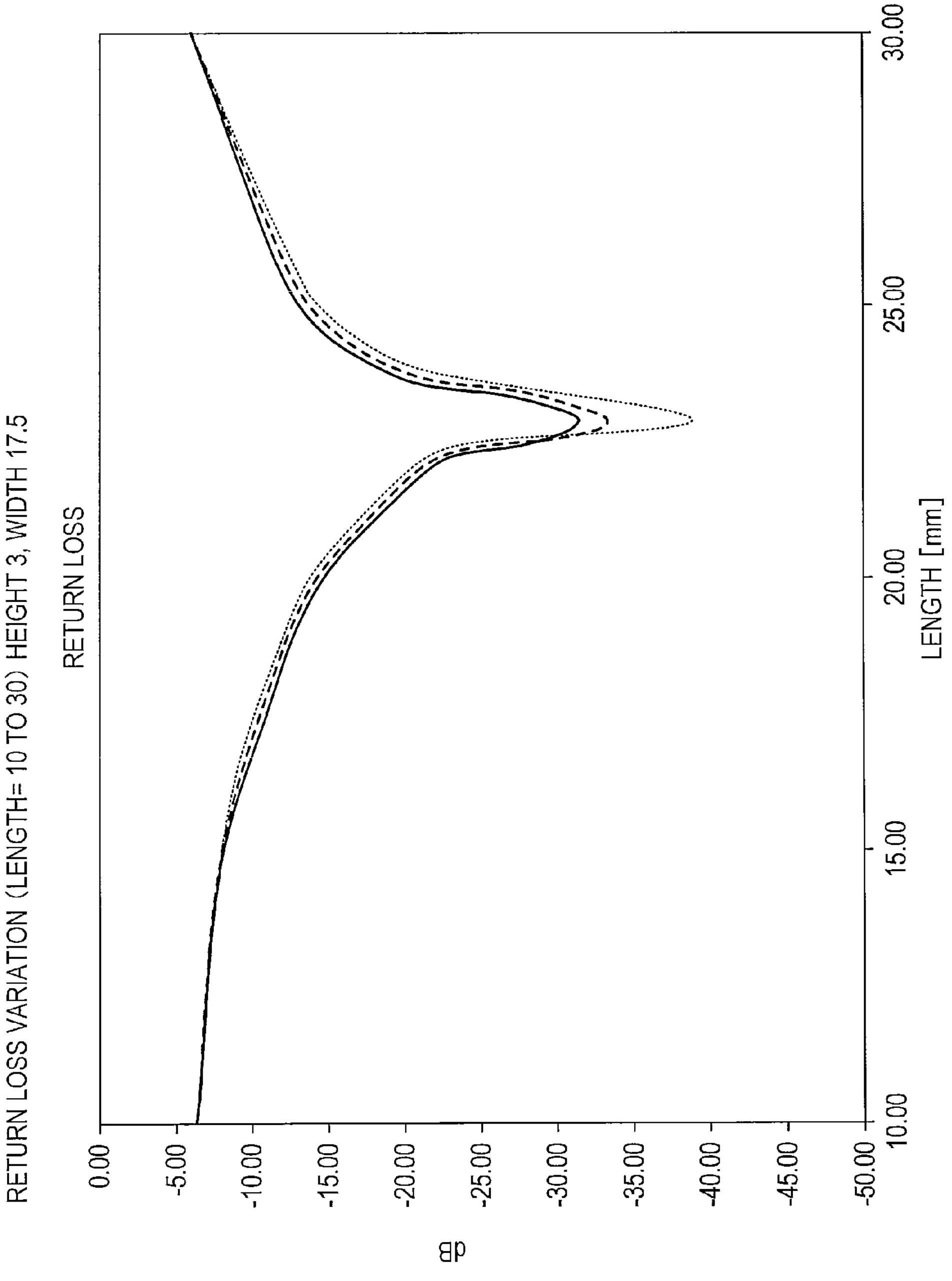
FIG. 18 is a chart illustrating return losses (ratio of reflection to an input (unit in dB)) of microwave at frequencies (9.38 GHz, 9.41 GHz, 9.44 GHz) wherein: width a=17.5 mm, height c=3 mm, and length b is varied from 10 to 30 mm.
Figure 19:
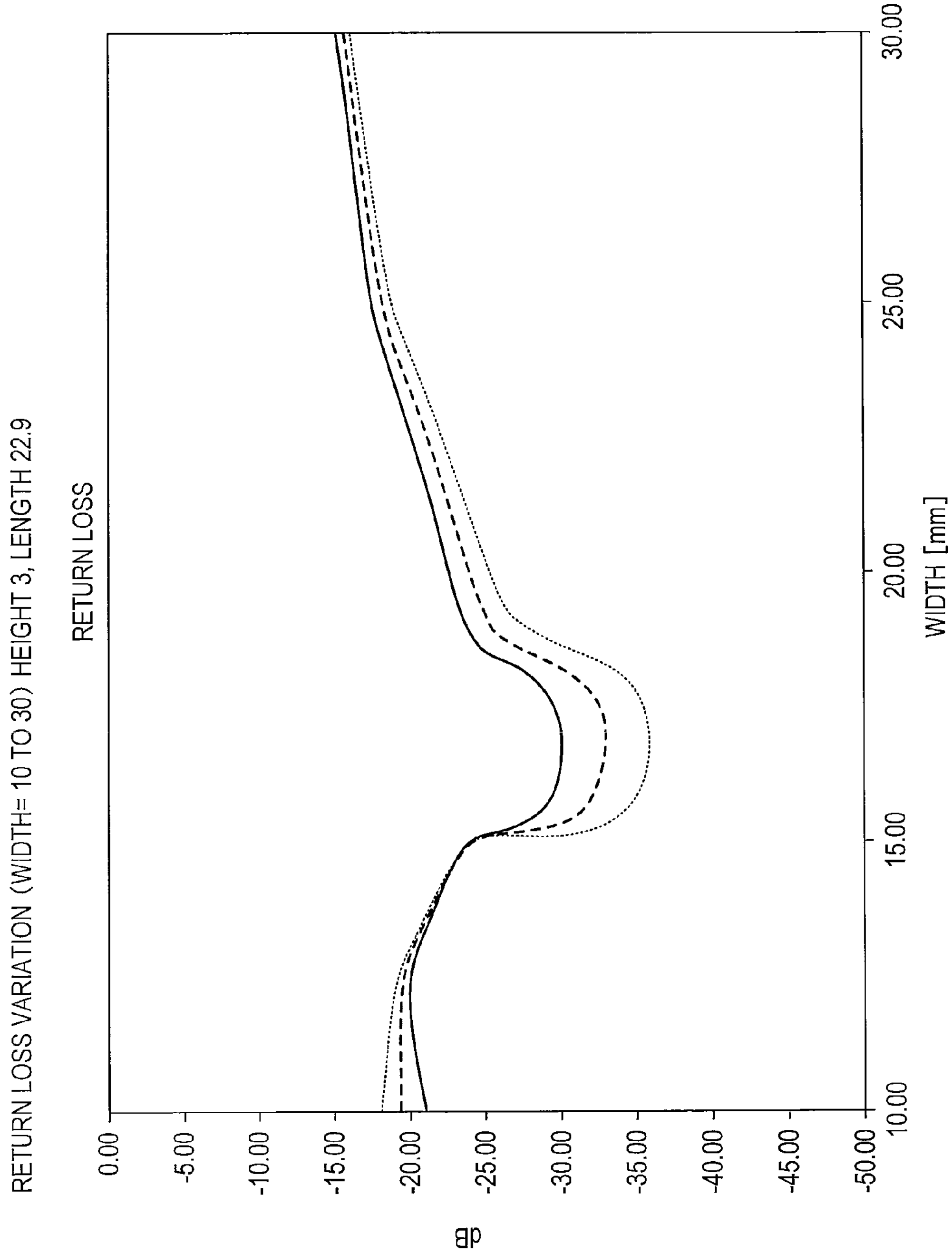
FIG. 19 is a chart illustrating return losses (ratio of reflection to an input (unit in dB)) of microwave at frequencies (9.38 GHz, 9.41 GHz, 9.44 GHz) wherein: length b=22.9 mm, height c=3 mm, and width a is varied from 10 to 30 mm.

FIGS. 17 through 19 are charts illustrating return losses (ratio of reflection to an input (unit in dB)) of microwave at the frequencies (9.38 GHz, 9.41 GHz, 9.44 GHz) when the width a, the length b, and the height c are varied appropriately. FIG. 17 illustrates the return losses of microwave at respective frequencies, where the width a=17.5 mm and the length b=22.9 mm, and the height c (horizontal axis) is varied from 0.5 mm to 9 mm. As illustrated in FIG. 17, the return losses of microwave at the frequencies are approximately −30 dB or below in each case when the height c is close to 3 mm.

FIG. 18 illustrates the return losses of microwave at respective frequencies, where the width a=17.5 mm and the height c=3 mm, and the length b (horizontal axis) is varied from 10 mm to 30 mm. As illustrated in FIG. 18, the return losses of microwave at the frequencies are approximately −30 dB or below in each case when the length b is close to 22.9 mm.

FIG. 19 illustrates the return losses of microwave at respective frequencies, where the length b=22.9 mm and the height c=3 mm, and the width a (horizontal axis) is varied from 10 mm to 30 mm. As illustrated in FIG. 19, the return losses of microwave at the frequencies are approximately −30 dB or below in each case when the width a is close to 17.5 mm. Note that, where the width a is other than 17.5 mm, for example, high 15 mm or near 16.5 mm, the return losses of microwave at the frequencies are approximately −30 dB or below in each case.

Figure 20:
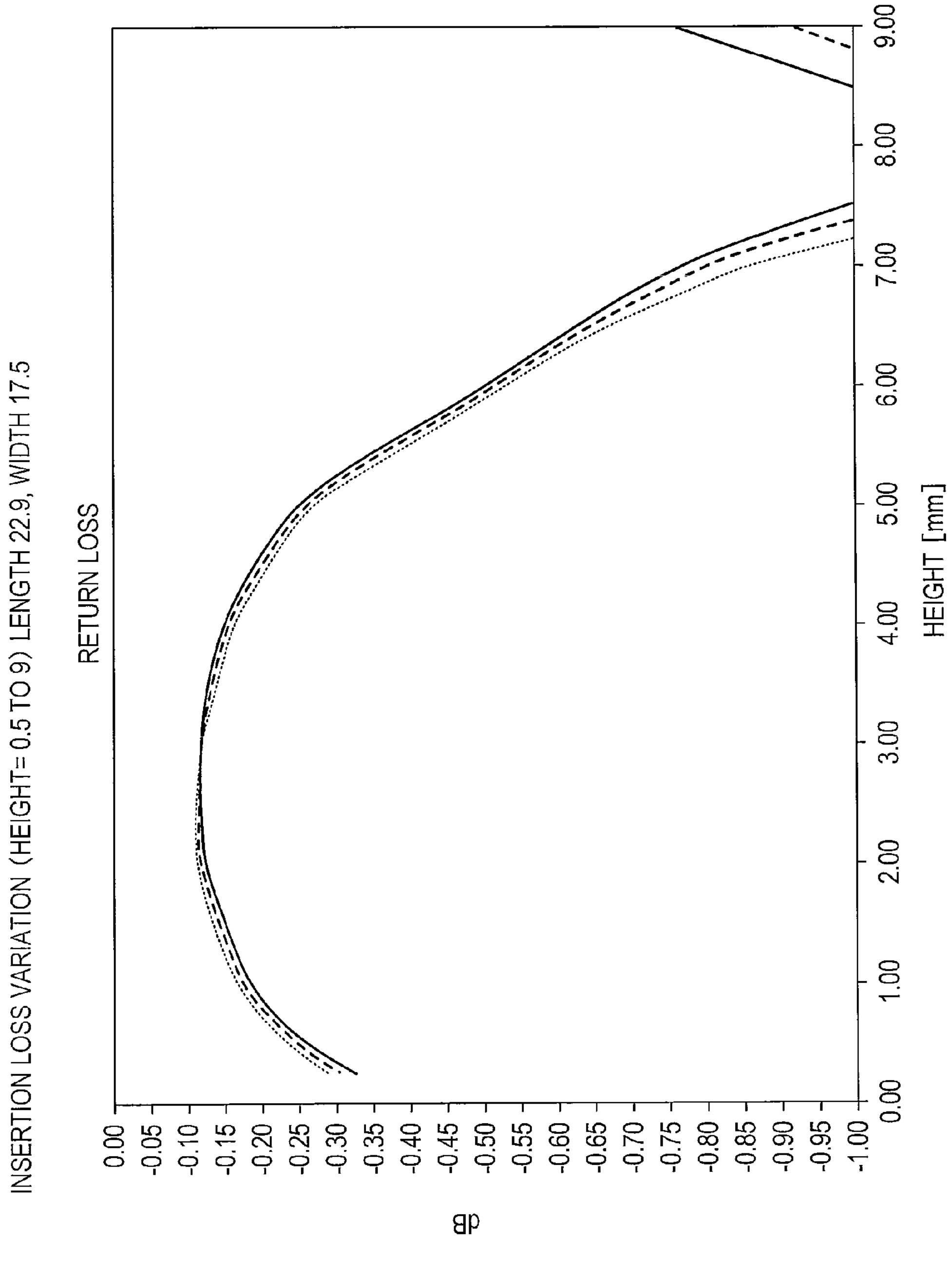
FIG. 20 is a chart illustrating insertion losses (ratio of loss, such as a consumption by heat energy, to an input (unit in dB)) of microwave at frequencies (9.38 GHz, 9.41 GHz, 9.44 GHz) wherein: width a=17.5 mm, length b=22.9 mm, and height c is varied from 0.5 to 9 mm.
Figure 21:
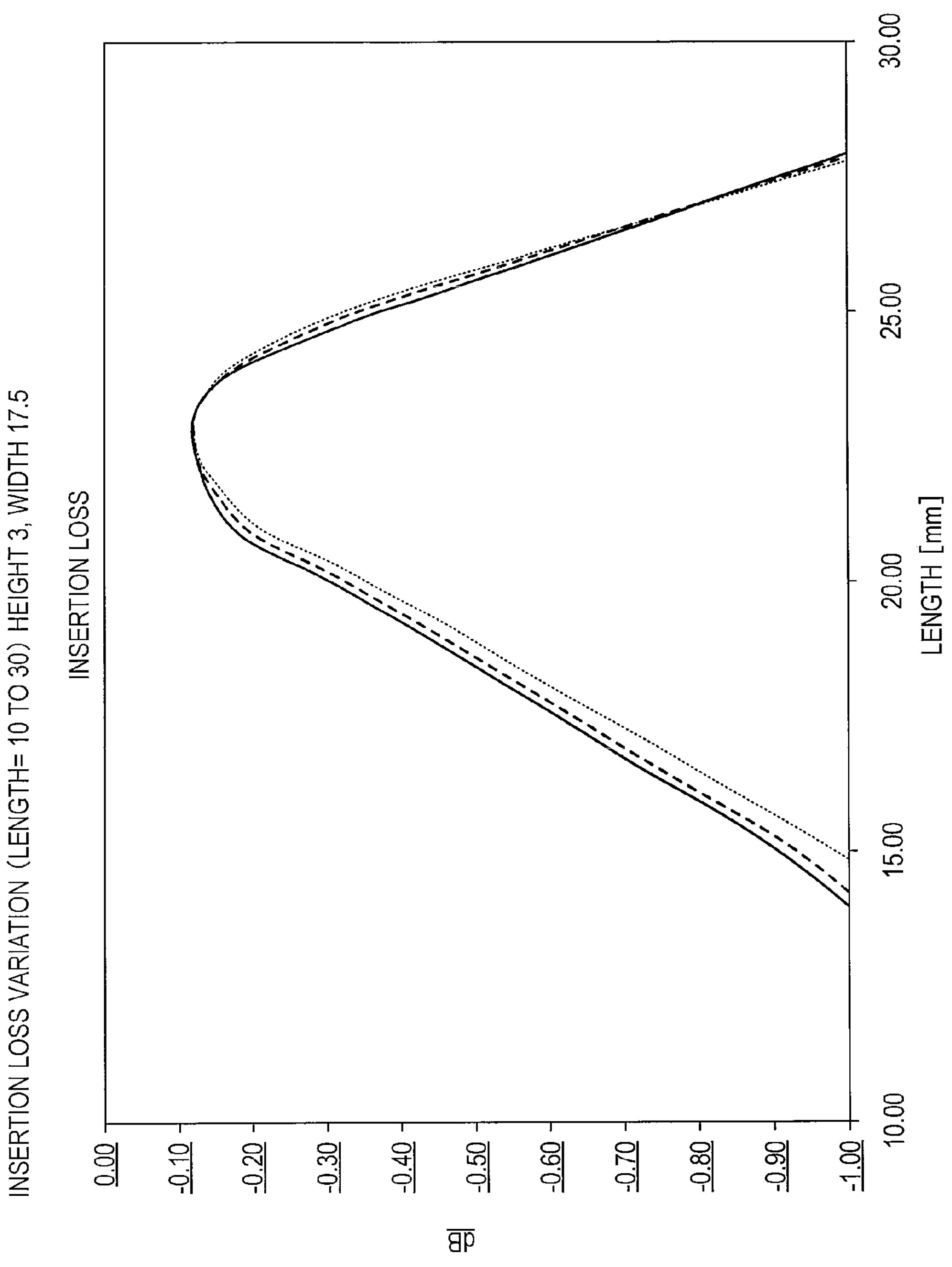
FIG. 21 is a chart illustrating insertion losses (ratio of loss, such as a consumption by heat energy, to an input (unit in dB)) of microwave at frequencies (9.38 GHz, 9.41 GHz, 9.44 GHz) wherein: width a=17.5 mm, height c=3 mm, and length b is varied from 10 to 30 mm.
Figure 22:
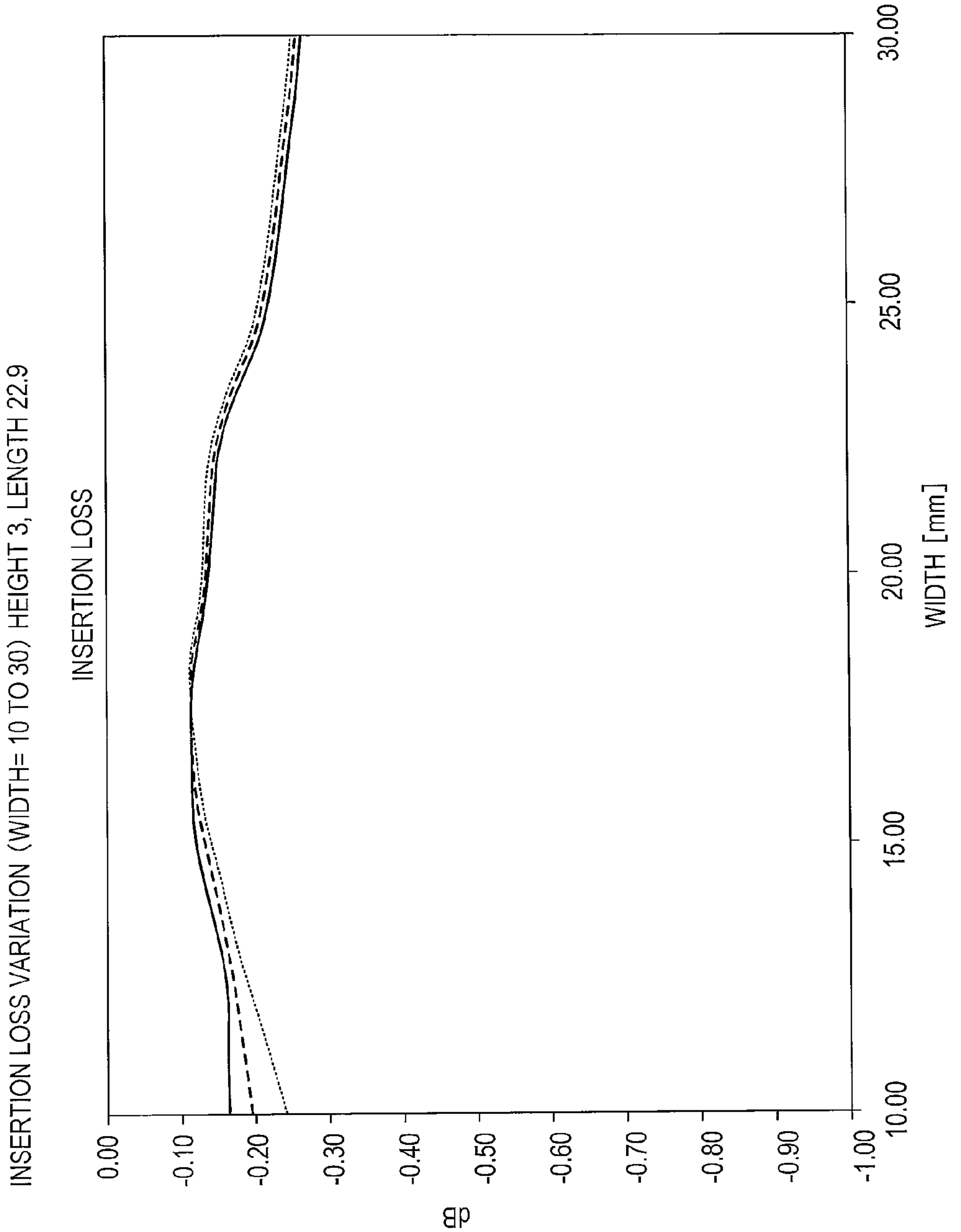
FIG. 22 is a chart illustrating insertion losses (ratio of loss, such as a consumption by heat energy, to an input (unit in dB)) of microwave at frequencies (9.38 GHz, 9.41 GHz, 9.44 GHz) wherein: length b=22.9 mm, height c=3 mm, and width a is varied from 10 to 30 mm.

FIGS. 20 through 22 are charts illustrating insertion losses (ratio of loss, such as consumption by heat energy, to an input (unit in dB)) of microwave at the frequencies (9.38 GHz, 9.41 GHz, 9.44 GHz) when the width a, the length b, and the height c are varied appropriately. FIG. 20 illustrates the insertion losses of microwave at respective frequencies, where the width a=17.5 mm and the length b=22.9 mm, and the height c (horizontal axis) is varied from 0.5 mm to 9 mm. As illustrated in FIG. 20, the insertion losses of microwave at the frequencies are extremely low at approximately −0.12 dB when the height c is 2 mm to 3 mm.

FIG. 21 illustrates the insertion losses of microwave at respective frequencies, where the width w=17.5 mm and the height c=3 mm, and the length b (horizontal axis) is varied from 10 mm to 30 mm. As illustrated in FIG. 21, the insertion losses of microwave at the frequencies are extremely low at approximately −0.12 dB when the length b is near 23 mm including 22.9 mm.

FIG. 22 illustrates the insertion losses of microwave at respective frequencies, where the length b=22.9 mm and the height c=3 mm, and the width a (horizontal axis) is varied from 10 mm to 30 mm. As illustrated in FIG. 22, the insertion losses of microwave at the frequencies are extremely low at approximately −0.12 dB when the width a is approximately 15 mm to 18 mm.

Figure 23:
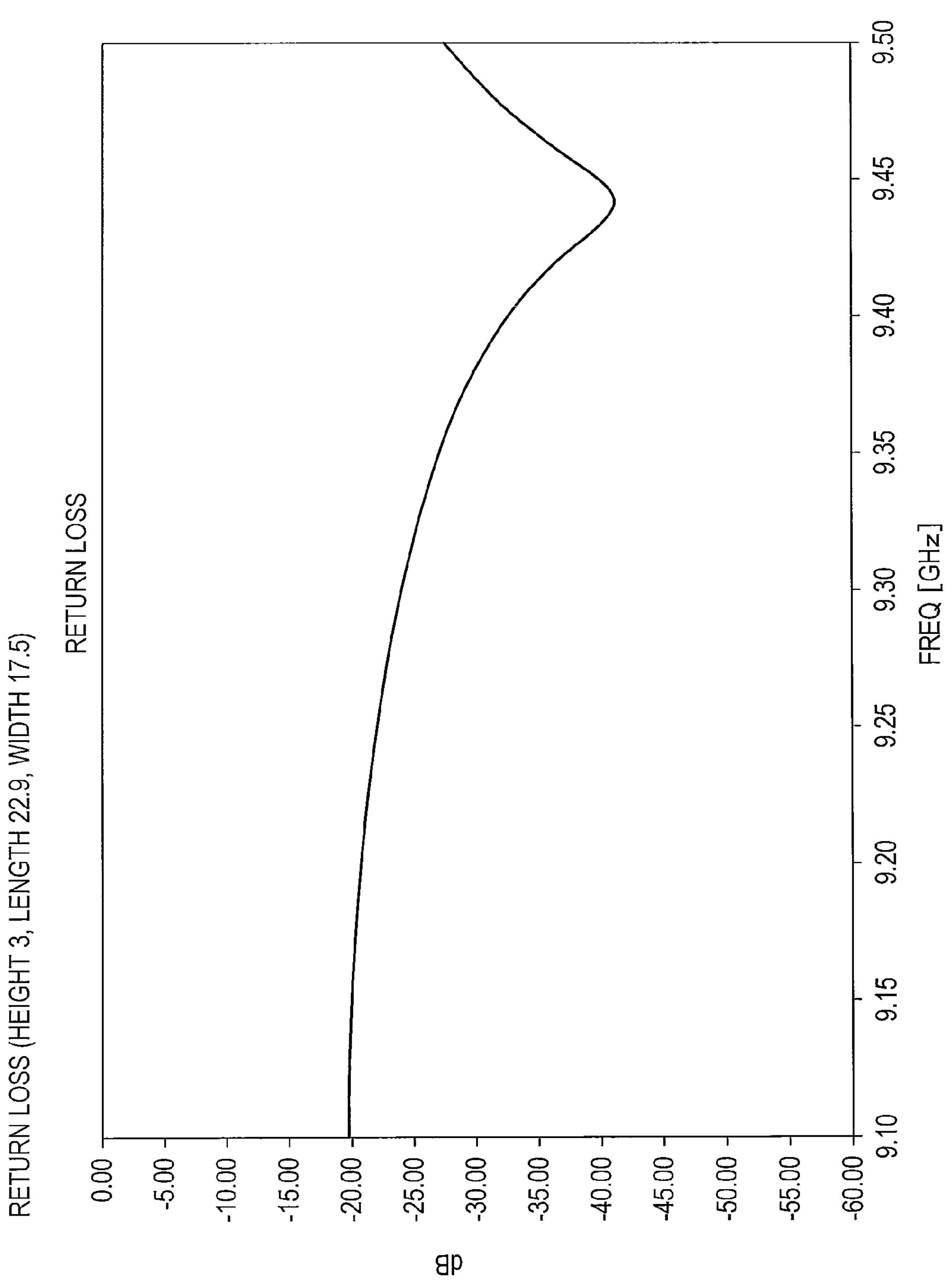
FIG. 23 is a chart illustrating a return loss of microwave at frequencies (9.38 GHz, 9.41 GHz, 9.44 GHz) wherein: width a=17.5 mm, length b=22.9 mm, and height c=3 mm.

FIG. 23 is a chart illustrating the return loss of microwave within the frequency band (the band including 9.38 GHz, 9.41 GHz, and 9.44 GHz) where the width a=17.5 mm, the length b=22.9 mm, and the height c=3 mm. The return loss is approximately −30 dB or below when the frequency is within 9.38 GHz to 9.44 GHz.

Figure 24:
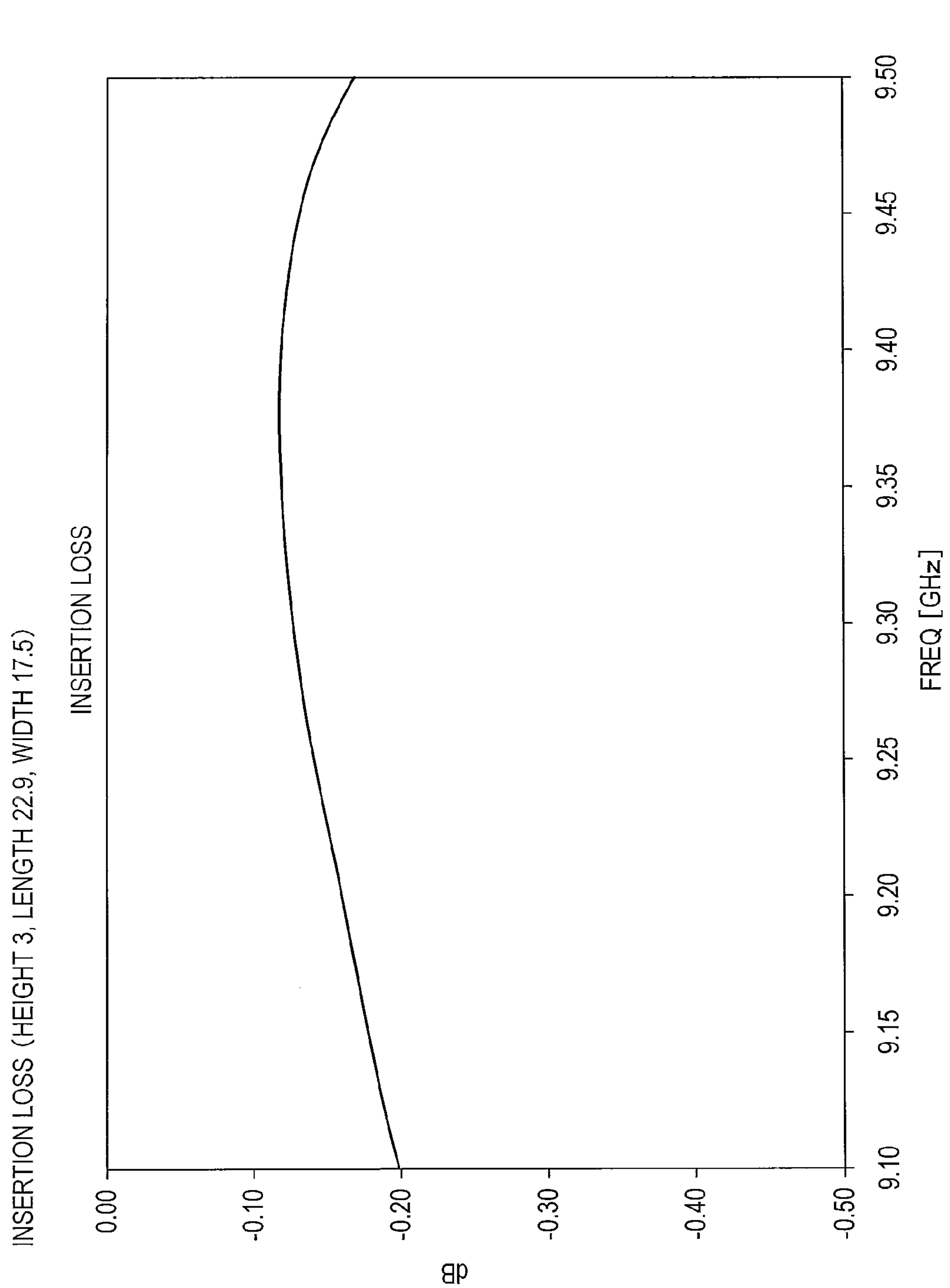
FIG. 24 is a chart illustrating an insertion loss of microwave at frequencies (9.38 GHz, 9.41 GHz, 9.44 GHz) wherein: width a=17.5 mm, length b=22.9 mm, and height=3 mm.
Figure 25A:
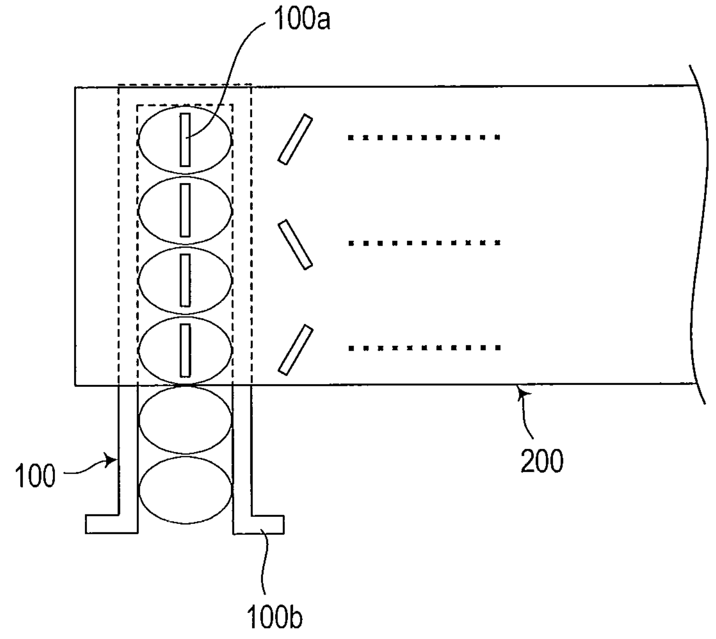
FIG. 25A (Conventional Art)
FIG. 25A is a view illustrating a configuration of a feeding waveguide with respect to a radiation waveguide according to the conventional art.
Figure 25B:
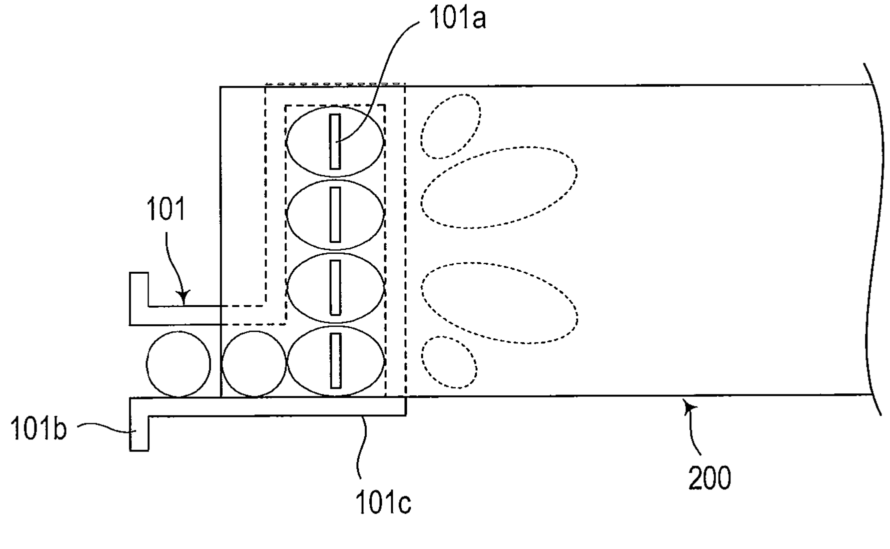
FIG. 25B (Conventional Art)
FIG. 25B is a view illustrating another configuration of the feeding waveguide with respect to the radiation waveguide according to the conventional art.

FIG. 24 is a chart illustrating the insertion loss of microwave within the frequency band (the band includes 9.38 GHz, 9.41 GHz, and 9.44 GHz) where the width a=17.5 mm, the length b=22.9 mm, and the height c=3 mm. The insertion loss is extremely low at approximately −0.12 dB or below when the frequency is within 9.38 GHz to 9.44 GHz.

As described above, for the microwave with the center frequency of 9.41 GHz and the frequency band width of 9.38 GHz to 9.44 GHz, the best dimensions for the step 16 are the length b=22.9 mm, the width a=17.5 mm, and the height c=3 mm.

Figure 26:
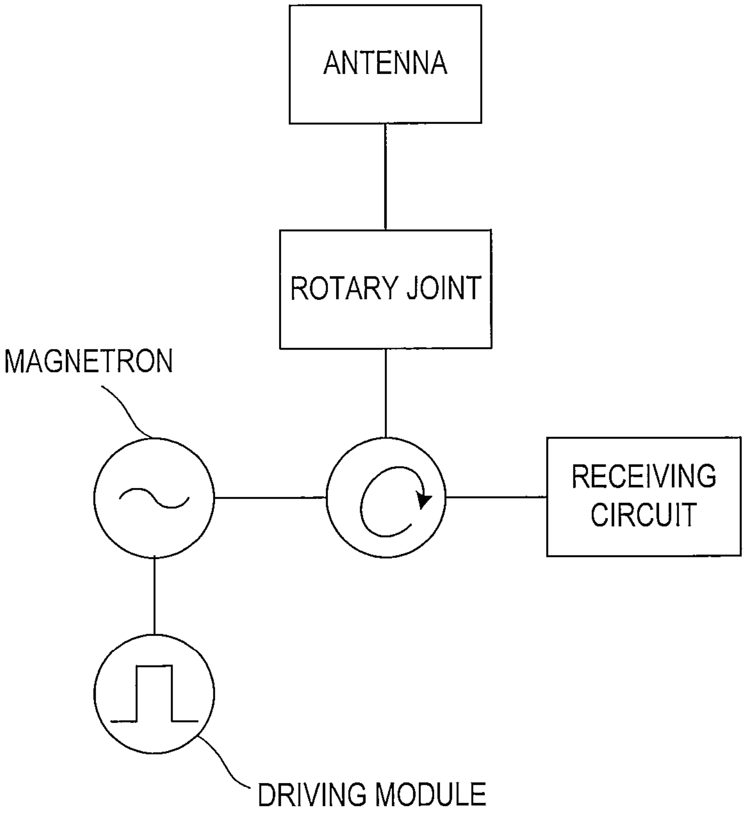
FIG. 26 is a schematic view illustrating a block diagram of a radar device according to one embodiment of the present invention.

The slot antenna of this embodiment may be utilized in a radar device for ships, for example. FIG. 26 is a schematic view illustrating a block diagram of the radar device of this embodiment. The radar device is equipped with a high-frequency circuit module. The high-frequency circuit module is equipped with a magnetron as a high-frequency wave generator for being driven intermittently by a driving module and outputting through oscillation a pulsating electromagnetic wave (a microwave). The high-frequency circuit unit is also equipped with a rotary joint which transmits a microwave to the aerial module side including the slot antenna, which becomes a rotation side where rotates in a horizontal plane. The slot antenna is rotated (circled) around its vertical axis by a rotation driving module such as a motor. The microwave radiation surface of the radiation waveguide part on the slot antenna is pointed toward a horizontal direction and has characteristics that give a microwave a necessary level of narrow directivity both in horizontal and vertical directions. In this configuration, a pulsating microwave is generated by a magnetron pulsed by the driving unit. The microwave travels through the rotary joint, the feeding waveguide part, the radiation waveguide part, and then is radiated toward all the horizontal directions from the radiation surface of the radiation waveguide part.

Note that the present invention can adopt following aspects.

(1) When the center frequency and the frequency band of microwave, which are to be used, are changed, the dimensions for the step 16, the length b, the width a, and the height c are set based on a wave length in the waveguide and the frequency band correspondingly. Note that the length b of the step 16 is affected by the size of the waveguide and the frequency which are used. The length b may be shortened when the waveguide is smaller or the frequency used is higher. Further, the width a of the step 16 is affected by the size of the waveguide and the frequency which are used. The width a may be narrowed when the waveguide is smaller or the frequency used is higher. Further, the height c of the step 16 is affected by the size of the waveguide and the frequency which are used, and is determined based on the frequency used.

(2) In this embodiment, the coaxial connector unit 41 is used; however, the waveguide may additionally be utilized to re-direct an electromagnetic wave.

(3) Each of the length b, the width a, and the height c of the step 16, which are the parameters, may be appropriately designed in order to optimize its dimensions. That is, by analyzing the changes in direction and degree of the deterioration of the mode distribution, the return losses, and the insertion losses, corresponding to an adjustment in direction and amount in each parameter, a further optimized dimension can be obtained.

(4) The step 16 is not limited to the rectangular parallelepiped shape; it may be a cylindrical shape. Even with the cylindrical shape, it is possible to efficiently diverge an electromagnetic wave inputted to the recessed section 14 into the both of width directions of the groove section 12.

(5) In this embodiment, the slot 35 (351-354) of the feeding part has four slots in the width direction, and the slots 22 of the radiation waveguide structure body 21 has three slots in the width direction. However, not limited to this, it may be designed various different types of slot array corresponding to a relationship with the frequency used, and an applied mode pattern.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A slot antenna, comprising:

a tubular electromagnetic wave radiation part having a hollow space;

a plurality of electromagnetic wave radiating slots for radiating electromagnetic waves being formed in at least a part of a first side surface of the radiation part;

a plurality of feeding slots for being inputted with the electromagnetic waves, the plurality of feeding slots being arrayed in line in an array direction orthogonal to a direction of tubular extent of the radiation part in a second side surface arranged opposite to the first side surface;

a feeding part having a hollow space, extending along the feeding slot array, and for feeding power from a power input point of the radiation part to the feeding slots;

a power guiding part having a hollow space and for guiding the power to the feeding part, the power guiding part extending in a direction orthogonal to the array direction of the feeding slots and in parallel to a center axis of the direction of tubular extent of the radiation part, from a location of the feeding part corresponding to at least one of the feeding slots; and a bulged portion made of an electrically conductive material, formed in at least a portion of an inner wall of the feeding part.

2. The slot antenna of claim 1, wherein the bulged portion is formed in a portion of the inner wall of the feeding part opposing to at least one of the plurality of feeding slots so that the portion of the feeding part is bulged more than an inner wall of the power guiding part facing the same side as the inner wall of the feeding part.

3. The slot antenna of claim 2, wherein the at least one of the feeding slots includes a slot other than a first or last slot of the feeding slot array.

4. The slot antenna of claim 3, wherein a center frequency of the electromagnetic wave is within a range from 9.38 GHz to 9.44 GHz and the bulged portion is bulged by 1 mm to 4 mm with respect to the inner wall of the feeding part.

5. The slot antenna of claim 2, wherein the plurality of radiating slots are arranged two-dimensionally.

6. The slot antenna of claim 5, wherein the feeding slot array direction is oriented in a direction orthogonal to the center axis of the radiation part.

7. The slot antenna of claim 6, further comprising a radome for accommodating the radiation part, the feeding part, and the power guiding part therein.

8. The slot antenna of claim 7, wherein the radome has a substantially tubular shape; and wherein the feeding part and the power guiding part are arranged in parallel to the center axis of the radome and in at least one of a position at the center axis and a position near the center axis of the radome.

9. The slot antenna of claim 8, further comprising a feeding waveguide arranged in parallel to the center axis of the radiation part and for guiding the power to the power guiding part from the power input point.

10. The slot antenna of claim 9, further comprising a coaxial connector having an inner conductor and an outer conductor and for feeding the power from the feeding waveguide to the power guiding part.

11. The slot antenna of claim 10, wherein the inner conductor protrudes inside the feeding waveguide.

12. The slot antenna of claim 11, wherein the feeding waveguide has a rectangular shape in cross-section, and a pair of opposing sides of the feeding waveguide in the cross-section in parallel to the array direction of the radiating slots has a length shorter than the length of the other pair of sides.

13. The slot antenna of claim 1, wherein a central axis extending along a length of the hollow space of the power guiding part connecting to the feeding part is arranged in a first direction and an opposite side of the central axis thereof is arranged in a second direction perpendicular to the first direction.

14. A radar device, comprising:

a slot antenna, the slot antenna including:

a tubular electromagnetic wave radiation part having a hollow space;

a plurality of electromagnetic wave radiating slots for radiating electromagnetic waves being formed in at least a part of a first side surface of the radiation part;

a plurality of feeding slots for being inputted with the electromagnetic waves, the plurality of feeding slots being arrayed in line in an array direction orthogonal to a direction of tubular extent of the radiation part in a second side surface arranged opposite to the first side surface;

a feeding part having a hollow space, extending along the feeding slot array, and for feeding power from a power input point of the radiation part to the feeding slots;

a power guiding part having a hollow space and for guiding the power to the feeding part, the power guiding part extending in a direction orthogonal to the array direction of the feeding slots and in parallel to a center axis of the direction of tubular extent of the radiation part, from a location of the feeding part corresponding to at least one of the feeding slots; and a stepped portion formed from an electrically conductive material in at least a portion of an inner wall of the feeding part;

an electromagnetic wave generating module for generating the electromagnetic wave to be supplied to the slot antenna;

a rotation module for rotating the slot antenna so that the radiation part rotates about the center axis of the direction of tubular extent of the radiation part; and a received signal processing module for receiving an echo signal of the electromagnetic wave reflected on a reflection body and detecting the reflection body.

15. The radar device of claim 14, wherein a center frequency of the electromagnetic wave is within 9.38 GHz to 9.44 GHz and the step has a height of 1 mm to 4 mm.

16. The radar device of claim 14, wherein wave radiating slots are formed two-dimensionally in the part of the side surface.

17. The radar device of claim 16, wherein the feeding slot array is oriented in a direction orthogonal to the center axis of the tubular electromagnetic wave radiation part.

18. The radar device of claim 17 further comprising a radome which accommodates the electromagnetic wave radiation part, the feeding waveguide part, and the power guiding waveguide part.

19. The radar device of claim 18, wherein the radome has a substantially tubular shape; and wherein the feeding part and the power guiding part are arranged in parallel to a center axis of the direction of tubular extent of the radome and in at least one of a position at the center axis and a position near the center axis of the radome.

20. The slot antenna of claim 1, wherein the electrically conductive material comprises a metal.

* * * * *